US009172994B2

(12) United States Patent
Sinha et al.

(10) Patent No.: US 9,172,994 B2
(45) Date of Patent: Oct. 27, 2015

(54) METHOD AND SYSTEM FOR AN AUTOMATIC CONTENT RECOGNITION ABSTRACTION LAYER

(71) Applicant: TURNER BROADCASTING SYSTEM, INC., Atlanta, GA (US)

(72) Inventors: Nishith Kumar Sinha, Mableton, GA (US); Donald Jude Loheide, Mableton, GA (US); Matthew Paul Giles, Marietta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 269 days.

(21) Appl. No.: 13/730,352

(22) Filed: Dec. 28, 2012

(65) Prior Publication Data
US 2013/0202150 A1 Aug. 8, 2013

Related U.S. Application Data

(60) Provisional application No. 61/596,012, filed on Feb. 7, 2012.

(51) Int. Cl.
*G06K 9/00* (2006.01)
*G06T 1/00* (2006.01)
(Continued)

(52) U.S. Cl.
CPC ........ *H04N 21/44008* (2013.01); *G06F 3/0484* (2013.01); *G06F 17/30495* (2013.01);
(Continued)

(58) Field of Classification Search
CPC ............ G06T 1/0021; G06F 17/30495; H04N 21/478; H04N 21/435; H04N 21/44008; H04N 21/812; H04N 21/4784; H04N 21/442; H04N 21/441; H04N 21/4722; H04N 21/00
USPC ........................................................ 382/100
See application file for complete search history.

(56) References Cited

U.S. PATENT DOCUMENTS 5,305,464 A 4/1994 Frett
5,410,326 A 4/1995 Goldstein
(Continued)

FOREIGN PATENT DOCUMENTS

EP 1485815 10/2007
EP 1354276 12/2007
(Continued)

OTHER PUBLICATIONS

Blackburn, Steven G., "Content Based Retrieval and Navigation of Music," University of Southampton Faculty of Engineering and Applied Science, Department of Electronics and Computer Science, Mar. 10, 1999.
(Continued)

*Primary Examiner* — Shefali Goradia
(74) *Attorney, Agent, or Firm* — Hopeton S. Walker; Loza & Loza, LLP

(57) ABSTRACT

A method and system for an automatic content recognition (ACR) abstraction layer are described in which real-time event manager in an ACR system may be utilized to receive interactive event identifiers and to assign those identifiers to sets of video fingerprints generated by multiple real-time fingerprint servers (RTFSs). The video fingerprints may be generated from a network television feed by utilizing video fingerprint technologies that are different for each RTFS. The interactive event identifiers may be determined from different sources. When determined from content ingested by the ACR system, for example, the interactive event identifiers may be based on a video fingerprinting process separate from those utilized by the RTFSs. The RTFSs may communicate the sets of video fingerprints and interactive event identifiers to corresponding fingerprint match systems, which in turn may communicate with devices that utilize the same video fingerprint technology as the corresponding RTFS.

48 Claims, 10 Drawing Sheets

(51) Int. Cl.
| | |
|---|---|
| *H04N 21/44* | (2011.01) |
| *G06F 17/30* | (2006.01) |
| *G06F 3/0484* | (2013.01) |
| *H04N 21/442* | (2011.01) |
| *H04N 21/4784* | (2011.01) |
| *H04N 21/4722* | (2011.01) |
| *H04N 21/478* | (2011.01) |
| *H04N 21/441* | (2011.01) |
| *H04N 21/81* | (2011.01) |
| *H04N 21/432* | (2011.01) |
| *H04N 21/00* | (2011.01) |

(52) U.S. Cl.
CPC ............... *G06T1/0021* (2013.01); *H04N 21/00* (2013.01); *H04N 21/432* (2013.01); *H04N 21/441* (2013.01); *H04N 21/442* (2013.01); *H04N 21/478* (2013.01); *H04N 21/4722* (2013.01); *H04N 21/4784* (2013.01); *H04N 21/812* (2013.01)

(56) References Cited

U.S. PATENT DOCUMENTS

| | | | |
|---|---|---|---|
| 5,437,050 | A | 7/1995 | Lamb et al. |
| 5,712,995 | A | 1/1998 | Cohn |
| 5,874,686 | A | 2/1999 | Ghias et al. |
| 5,918,223 | A | 6/1999 | Blum et al. |
| 5,956,683 | A | 9/1999 | Jacobs et al. |
| 5,991,737 | A | 11/1999 | Chen |
| 6,121,530 | A | 9/2000 | Sonoda |
| 6,184,877 | B1 | 2/2001 | Dodson et al. |
| 6,201,176 | B1 | 3/2001 | Yourlo |
| 6,314,577 | B1 | 11/2001 | Pocock |
| 6,408,272 | B1 | 6/2002 | White et al. |
| 6,504,089 | B1 | 1/2003 | Nagasawa et al. |
| 6,556,218 | B1 | 4/2003 | Alcorn |
| 6,760,720 | B1 | 7/2004 | De Bellis |
| 6,765,595 | B2 | 7/2004 | Lee et al. |
| 6,834,308 | B1 | 12/2004 | Ikezoye et al. |
| 6,968,337 | B2 | 11/2005 | Wold |
| 6,990,453 | B2 | 1/2006 | Wang et al. |
| 7,080,325 | B2 | 7/2006 | Treibach-Heck et al. |
| 7,095,871 | B2 | 8/2006 | Jones |
| 7,134,132 | B1 | 11/2006 | Ngo |
| 7,174,293 | B2 | 2/2007 | Kenyon et al. |
| 7,190,971 | B1 | 3/2007 | Kawamoto |
| 7,194,752 | B1 | 3/2007 | Kenyon et al. |
| 7,266,343 | B1 | 9/2007 | Yli-juuti et al. |
| 7,363,278 | B2 | 4/2008 | Schmelzer et al. |
| 7,444,353 | B1 | 10/2008 | Chen et al. |
| 7,500,007 | B2 | 3/2009 | Ikezoye et al. |
| 7,529,659 | B2 | 5/2009 | Wold |
| 7,562,012 | B1 | 7/2009 | Wold et al. |
| 7,562,392 | B1 | 7/2009 | Rhoads et al. |
| 7,565,327 | B2 | 7/2009 | Schmelzer |
| 7,624,416 | B1 | 11/2009 | Vandermolen |
| 7,703,114 | B2 | 4/2010 | Thukral |
| 7,707,088 | B2 | 4/2010 | Schmelzer |
| 7,711,652 | B2 | 5/2010 | Schmelzer |
| 7,730,509 | B2 | 6/2010 | Boulet et al. |
| 7,747,749 | B1 * | 6/2010 | Erikson et al. ............... 709/226 |
| 7,783,489 | B2 | 8/2010 | Kenyon et al. |
| 7,797,249 | B2 | 9/2010 | Schmelzer et al. |
| 7,813,954 | B1 | 10/2010 | Price |
| 7,870,574 | B2 | 1/2011 | Kenyon et al. |
| 7,877,290 | B1 | 1/2011 | Arsenault |
| 7,877,438 | B2 | 1/2011 | Schrempp et al. |
| 7,900,228 | B2 | 3/2011 | Stark et al. |
| 7,917,645 | B2 | 3/2011 | Ikezoye et al. |
| 8,006,274 | B2 | 8/2011 | Scott, III |
| 8,046,803 | B1 | 10/2011 | Lee |
| 8,117,635 | B2 | 2/2012 | Hendricks et al. |
| 8,249,422 | B2 | 8/2012 | Narahara et al. |
| 8,281,339 | B1 | 10/2012 | Walker |
| 8,335,833 | B1 | 12/2012 | Parkinson |
| 8,407,750 | B2 | 3/2013 | Vorbau |
| 8,413,206 | B1 | 4/2013 | Wyatt et al. |
| 8,418,206 | B2 | 4/2013 | Bryant et al. |
| 8,553,148 | B2 | 10/2013 | Ramaswamy et al. |
| 8,572,650 | B2 | 10/2013 | Townsend et al. |
| 8,732,473 | B2 * | 5/2014 | Bisso et al. ............... 713/176 |
| 8,732,739 | B2 | 5/2014 | Sillerman |
| 8,793,274 | B2 * | 7/2014 | Yu et al. ............... 707/769 |
| 8,810,512 | B2 | 8/2014 | Andersson |
| 2002/0032906 | A1 | 3/2002 | Grossman |
| 2002/0069100 | A1 | 6/2002 | Arberman |
| 2002/0073419 | A1 | 6/2002 | Yen |
| 2002/0078441 | A1 | 6/2002 | Drake |
| 2002/0083060 | A1 | 6/2002 | Wang et al. |
| 2002/0120925 | A1 | 8/2002 | Logan |
| 2002/0133817 | A1 | 9/2002 | Markel |
| 2002/0178447 | A1 | 11/2002 | Plotnick |
| 2003/0002638 | A1 | 1/2003 | Kaars |
| 2003/0035075 | A1 | 2/2003 | Butler et al. |
| 2003/0055699 | A1 | 3/2003 | O'Connor |
| 2003/0056101 | A1 | 3/2003 | Epstein |
| 2003/0101451 | A1 | 5/2003 | Bentolila |
| 2003/0149975 | A1 | 8/2003 | Eldering |
| 2003/0154475 | A1 | 8/2003 | Rodriguez |
| 2003/0172381 | A1 | 9/2003 | Janevski |
| 2004/0003397 | A1 | 1/2004 | Boston et al. |
| 2004/0031046 | A1 | 2/2004 | Weinblatt et al. |
| 2004/0034874 | A1 | 2/2004 | Hord |
| 2004/0068737 | A1 | 4/2004 | Itoh et al. |
| 2004/0143349 | A1 | 7/2004 | Roberts |
| 2004/0143845 | A1 | 7/2004 | Lin |
| 2004/0189710 | A1 | 9/2004 | Goulden |
| 2004/0205810 | A1 | 10/2004 | Matheny et al. |
| 2004/0210847 | A1 | 10/2004 | Berson |
| 2004/0255322 | A1 | 12/2004 | Meadows et al. |
| 2005/0022211 | A1 | 1/2005 | Veselov et al. |
| 2005/0097599 | A1 | 5/2005 | Plotnick et al. |
| 2005/0149968 | A1 | 7/2005 | Konig |
| 2005/0235307 | A1 | 10/2005 | Relan |
| 2005/0278731 | A1 | 12/2005 | Cameron |
| 2006/0015923 | A1 | 1/2006 | Chuah |
| 2006/0026636 | A1 | 2/2006 | Stark et al. |
| 2006/0031684 | A1 | 2/2006 | Sharma et al. |
| 2006/0187358 | A1 | 8/2006 | Lienhart |
| 2006/0195860 | A1 | 8/2006 | Eldering |
| 2066/0282847 | A1 | 12/2006 | Gupte |
| 2007/0078009 | A1 | 4/2007 | Lockton |
| 2007/0192784 | A1 | 8/2007 | Postrel |
| 2007/0250901 | A1 | 10/2007 | McIntire |
| 2008/0064490 | A1 | 3/2008 | Ellis |
| 2008/0104634 | A1 | 5/2008 | Gajdos et al. |
| 2008/0127253 | A1 | 5/2008 | Zhang |
| 2008/0227436 | A1 | 9/2008 | Gantman |
| 2008/0244640 | A1 | 10/2008 | Belleguie |
| 2008/0250447 | A1 | 10/2008 | Rowe |
| 2008/0305815 | A1 | 12/2008 | McDonough |
| 2008/0310731 | A1 | 12/2008 | Stojancic et al. |
| 2008/0313140 | A1 | 12/2008 | Pereira et al. |
| 2009/0009532 | A1 | 1/2009 | Hallberg |
| 2009/0064261 | A1 | 3/2009 | Jung |
| 2009/0077046 | A1 | 3/2009 | Narahara et al. |
| 2009/0077489 | A1 | 3/2009 | Homma |
| 2009/0094637 | A1 | 4/2009 | Lemmons |
| 2009/0106104 | A1 | 4/2009 | Upendran et al. |
| 2009/0119723 | A1 | 5/2009 | Tinsman |
| 2009/0133049 | A1 | 5/2009 | Bradley |
| 2009/0150930 | A1 | 6/2009 | Sherwin et al. |
| 2009/0235317 | A1 | 9/2009 | Igarashi |
| 2009/0259690 | A1 | 10/2009 | Bogdanov |
| 2009/0288113 | A1 | 11/2009 | Skinner |
| 2009/0317053 | A1 | 12/2009 | Morley |
| 2009/0318114 | A1 | 12/2009 | Bertoni |
| 2009/0319522 | A1 | 12/2009 | Karstens |
| 2009/0327894 | A1 | 12/2009 | Rakib et al. |
| 2010/0007797 | A1 | 1/2010 | Stojancic |
| 2010/0043040 | A1 | 2/2010 | Olsen |
| 2010/0095337 | A1 | 4/2010 | Dua |
| 2010/0121691 | A1 | 5/2010 | Shifflett et al. |

(56) References Cited

U.S. PATENT DOCUMENTS

| | | |
|---|---|---|
| 2010/0125498 A1 | 5/2010 | Jaramillo |
| 2010/0158391 A1 | 6/2010 | Cunningham |
| 2010/0162344 A1 | 6/2010 | Casagrande et al. |
| 2010/0169906 A1 | 7/2010 | Takahashi |
| 2010/0175078 A1 | 7/2010 | Knudson |
| 2010/0205627 A1 | 8/2010 | Cesmedziev |
| 2010/0205628 A1 | 8/2010 | Davis et al. |
| 2010/0242065 A1 | 9/2010 | Murakami |
| 2010/0245681 A1 | 9/2010 | Harris |
| 2010/0269128 A1* | 10/2010 | Gordon .......................... 725/25 |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2010/0325135 A1 | 12/2010 | Chen et al. |
| 2011/0067046 A1 | 3/2011 | Cox et al. |
| 2011/0067066 A1 | 3/2011 | Barton |
| 2011/0078729 A1 | 3/2011 | Lajoie et al. |
| 2011/0078733 A1 | 3/2011 | Lee |
| 2011/0088063 A1 | 4/2011 | Ben-Romdhane et al. |
| 2011/0107363 A1 | 5/2011 | Sanghavi |
| 2011/0122255 A1 | 5/2011 | Haritaoglu |
| 2011/0177775 A1 | 7/2011 | Gupta et al. |
| 2011/0191806 A1 | 8/2011 | Knudson et al. |
| 2011/0219419 A1 | 9/2011 | Reisman |
| 2011/0280434 A1 | 11/2011 | Mamidwar et al. |
| 2011/0283322 A1 | 11/2011 | Hamano |
| 2011/0283327 A1 | 11/2011 | Zhu |
| 2011/0289098 A1* | 11/2011 | Oztaskent et al. ............ 707/769 |
| 2011/0289114 A1 | 11/2011 | Yu et al. |
| 2011/0289524 A1 | 11/2011 | Toner |
| 2011/0307931 A1 | 12/2011 | Shuster |
| 2011/0311095 A1* | 12/2011 | Archer .......................... 382/100 |
| 2011/0313856 A1* | 12/2011 | Cohen et al. ............... 705/14.49 |
| 2011/0314491 A1 | 12/2011 | Delidais et al. |
| 2011/0314495 A1 | 12/2011 | Zenor |
| 2012/0017236 A1 | 1/2012 | Stafford et al. |
| 2012/0042334 A1 | 2/2012 | Choi |
| 2012/0054848 A1 | 3/2012 | Salowey et al. |
| 2012/0079521 A1 | 3/2012 | Garg et al. |
| 2012/0096491 A1 | 4/2012 | Shkedi |
| 2012/0117584 A1 | 5/2012 | Gordon |
| 2012/0124625 A1 | 5/2012 | Foote |
| 2012/0144416 A1 | 6/2012 | Wetzer |
| 2012/0167133 A1 | 6/2012 | Carroll |
| 2012/0174157 A1 | 7/2012 | Stinson |
| 2012/0185895 A1 | 7/2012 | Wong et al. |
| 2012/0192227 A1 | 7/2012 | Fleischman |
| 2012/0215789 A1 | 8/2012 | Ramanathan |
| 2012/0246693 A1 | 9/2012 | Iqbal |
| 2012/0303442 A1 | 11/2012 | Patwa |
| 2012/0311618 A1 | 12/2012 | Blaxland |
| 2012/0317240 A1 | 12/2012 | Wang |
| 2012/0331496 A1 | 12/2012 | Copertino et al. |
| 2013/0014146 A1 | 1/2013 | Bhatia et al. |
| 2013/0019262 A1 | 1/2013 | Bhatia et al. |
| 2013/0047178 A1 | 2/2013 | Moon |
| 2013/0047180 A1 | 2/2013 | Moon et al. |
| 2013/0125163 A1 | 5/2013 | Chen et al. |
| 2013/0132999 A1 | 5/2013 | Pandey |
| 2013/0162902 A1 | 6/2013 | Musser |
| 2013/0163957 A1 | 6/2013 | Ikizyan |
| 2013/0167171 A1 | 6/2013 | Kitazato et al. |
| 2013/0174191 A1 | 7/2013 | Thompson, Jr. et al. |
| 2013/0198768 A1* | 8/2013 | Kitazato .......................... 725/19 |
| 2013/0205315 A1 | 8/2013 | Sinha et al. |
| 2013/0205316 A1 | 8/2013 | Sinha et al. |
| 2013/0205318 A1 | 8/2013 | Sinha et al. |
| 2013/0205319 A1 | 8/2013 | Sinha et al. |
| 2013/0205335 A1 | 8/2013 | Sinha et al. |
| 2013/0208942 A1 | 8/2013 | Davis |
| 2013/0222597 A1 | 8/2013 | Brink |
| 2013/0239163 A1 | 9/2013 | Kim et al. |
| 2013/0305335 A1 | 11/2013 | Syed et al. |
| 2013/0332951 A1 | 12/2013 | Gharaat |
| 2013/0339999 A1 | 12/2013 | Sangiovanni |
| 2014/0082659 A1 | 3/2014 | Fife |
| 2014/0089815 A1* | 3/2014 | Gildfind et al. ............... 715/753 |
| 2014/0150022 A1 | 5/2014 | Oh |
| 2014/0164994 A1 | 6/2014 | Myslinski |

FOREIGN PATENT DOCUMENTS

| | | |
|---|---|---|
| JP | 11055201 | 2/1999 |
| WO | WO9517746 | 6/1995 |

OTHER PUBLICATIONS

Blackburn, Steven G., "Search by Humming," University of Southampton Faculty of Engineering, Department of Electronics and Computer Science, May 8, 1997.

Ghias, Asif et al, "Query by Humming—Musical Information Retrieval in an Audio Database," ACM Multimedia 95—Electronic Proceedings, Nov. 5-9, 1995, San Francisco, CA.

ProQuest, PR Newswire, New York, "Mobile Music: Comcast Cellular First in U.S. to Trial Breakthrough Interactive Music Service Call CD," Feb. 11, 1999, p. 1.

Taylor, Chuck, "Company Lets Listeners Dial for CDs StarCD Turns Cell Phones Into Radio-Music Storefronts," Billboard: Jun. 26, 1999; 111, 26; General Interest Module, p. 86.

Tseng, Yuen-Hsien, "Content-Based Retrieval for Music Collections," SIGIR99 22nd Annual International ACM SIGIR Conference on Research and Development in Information Retrieval, Berkeley, CA, Aug. 15-19, 1999.

Whittle, Robin, "Future Developments in the Music Market," Contemporary Music Summit in Canberra Apr. 27, 1995, Apr. 11, 1995.

* cited by examiner

METHOD AND SYSTEM FOR AN AUTOMATIC CONTENT RECOGNITION ABSTRACTION LAYER

CROSS-REFERENCE TO RELATED APPLICATIONS/INCORPORATION BY REFERENCE

This application makes reference to, claims priority to, and claims the benefit of U.S. provisional application 61/596,012, filed on Feb. 7, 2012.

This application also makes reference to:
U.S. patent application Ser. No. 13/730,422 filed on Dec. 28, 2012;
U.S. patent application Ser. No. 13/730,459, filed Dec. 28, 2012;
U.S. patent application Ser. No. 13/730,495, filed Dec. 28, 2012;
U.S. patent application Ser. No. 13/730,530, filed Dec. 28, 2012;
U.S. patent application Ser. No. 13/730,754, filed Dec. 28, 2012;
U.S. patent application Ser. No. 13/730,559, filed Dec. 28, 2012;
U.S. patent application Ser. No. 13/730,579, filed Dec. 28, 2012;
U.S. patent application Ser. No. 13/730,593, filed Dec. 28, 2012;
U.S. patent application Ser. No. 13/730,759, filed Dec. 28, 2012;
U.S. patent application Ser. No. 13/730,627, filed Dec. 28, 2012;
U.S. patent application Ser. No. 13/730,644, filed Dec. 28, 2012;
U.S. patent application Ser. No. 13/730,656, filed Dec. 28, 2012;
U.S. patent application Ser. No. 13/730,670, filed Dec. 28, 2012;
U.S. patent application Ser. No. 13/730,691, filed Dec. 28, 2012;
U.S. patent application Ser. No. 13/730,702, filed Dec. 28, 2012;
U.S. patent application Ser. No. 13/730,718, filed Dec. 28, 2012; and
U.S. patent application Ser. No. 13/730,734, filed Dec. 28, 2012.

Each of the above referenced applications is hereby incorporated herein by reference in its entirety.

FIELD OF TECHNOLOGY

Certain embodiments of the invention relate to digital audio/video content recognition. More specifically, certain embodiments of the invention relate to a method and system for an automatic content recognition abstraction layer.

BACKGROUND

Smart or connected televisions (TVs) may receive data from data networks that allow a viewer to not only access broadcast digital content, but to also receive multimedia content.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an automatic content recognition abstraction layer, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
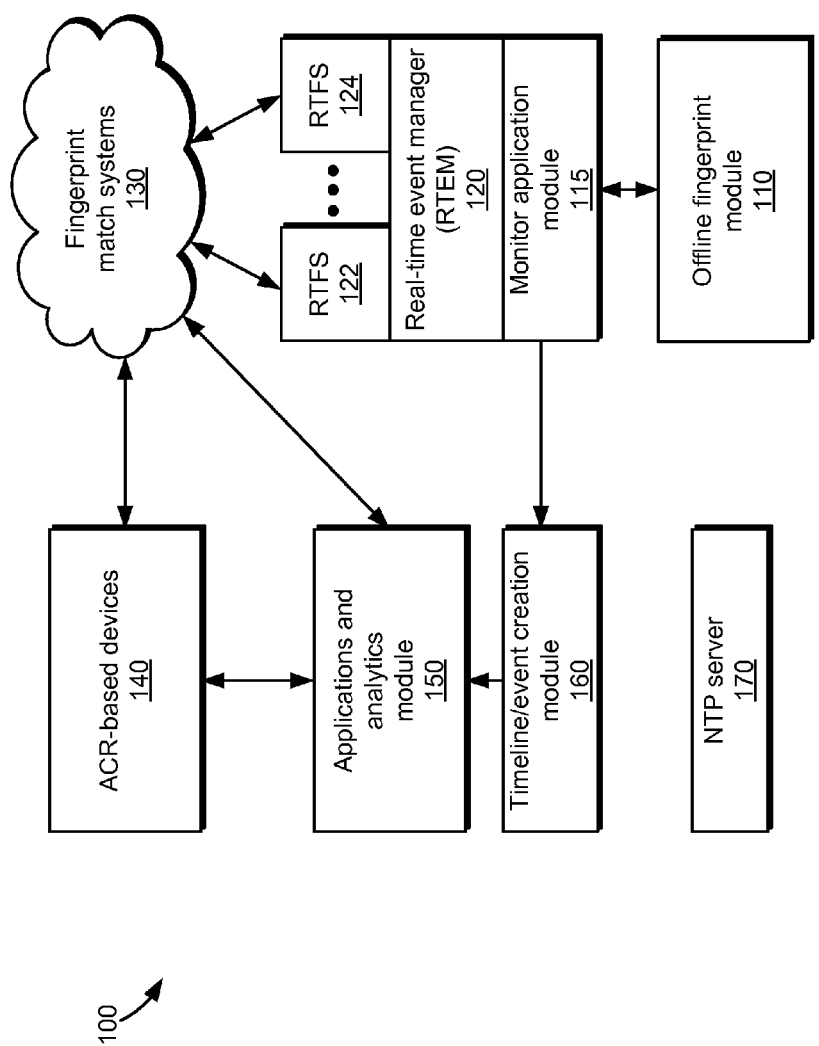
FIG. 1 is a high-level block diagram that illustrates an exemplary automatic content recognition system with abstraction layer, in accordance with an embodiment of the invention.

Certain embodiments of the invention may be found in a method and system for an automatic content recognition (ACR) abstraction layer. Various embodiments of the invention provide for a system architecture that implements the ACR abstraction layer based on utilizing a real-time event manager (RTEM) to communicate with multiple fingerprint servers. The RTEM can operate as a triggering mechanism that provides events (i.e., event identifier and corresponding data) to the multiple fingerprint servers (RTFS's), each of which associates the event(s) to the corresponding fingerprints of the broadcast network. Each RTFS may employ a different fingerprinting technology. At least portions of the system architecture can be synchronized using a network/broadcast time server, which is also referred to as a network protocol time (NTP) server. That is, the RTEM and the fingerprinting servers can operate based on a common reference clock provided by the NTP server. Each of the fingerprint servers may generate a set of video fingerprints in real time from a network television feed by utilizing a video fingerprint technology that is different from the technology utilized by any of the other fingerprint servers. The different fingerprinting technologies may be from different fingerprinting vendors, for example. The fingerprint servers may also be referred to as real-time fingerprint servers (RTFSs). A monitor application in the ACR system may be operable to assign one or more interactive event identifiers to the RTEM by associating an NTP broadcast time to a fingerprint that is then propagated to other fingerprint systems (e.g., fingerprint servers) via an application programming interface (API). The fingerprint servers may communicate the sets of video fingerprints and interactive event identifiers to corresponding fingerprint match systems, which in turn may communicate with devices that utilize the same video fingerprint technology as the corresponding fingerprint server.

The assignment of the event identifiers is based on a broadcast NTP time corresponding to each identified event. The event identifiers may provide information about different interactive events that may take place in a connected or smart TV. A connected TV may refer to, for example, a television that has internet access and/or is capable of running applications. The event identifiers may also be referred to as interactive event identifiers (IDs), for example. The event identifiers may be determined in real time from a director's input for live programming, apriori from a predetermined network schedule, or from previously ingested content with interactivity defined (e.g., offline content). When determined from previously ingested content, the interactive event identifiers may be determined using a video fingerprinting process that is separate from those utilized by the fingerprint servers. This process may rely on any of the video fingerprinting technologies utilized by the fingerprint servers or on a different technology altogether The abstraction layer may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors.

Fingerprinting, and more particularly ACR fingerprinting, may refer to a process by which features of a video frame or a set thereof, and/or of an audio frame or a set thereof, may be analyzed to create representations (i.e., fingerprints) for each piece of content, for example. The fingerprints may be unique to each piece or sequence of content and may be highly robust against broadcast distortions such as re-encoding, aspect ratio, frame rate, up/down conversion, and pitch correction, to name a few. The fingerprints may be stored in a reference database in the ACR system such that unidentified content (e.g., content from a live network television feed or broadcast) may be identified by comparing fingerprints taken of the unidentified content with the stored fingerprints.

Once the event identifiers have been assigned by the monitor application and communicated to the real-time fingerprint servers via the real-time event manager, the real-time fingerprint servers may communicate the video fingerprints and the assigned event identifiers to corresponding fingerprint match systems. In some instances, the fingerprint match systems may be operated by a third party (e.g., television manufacturers, vendors etc.) as hosted services over the Internet (e.g., cloud computing, etc.). Each of the fingerprint match systems may communicate with devices (e.g., connected TVs, tablets, smartphones, etc.) that utilize the same video fingerprint technology utilized by the fingerprint server that corresponds to that fingerprint match system. These devices may be referred to as viewer or end user devices, for example.

The fingerprint match systems receive video fingerprints from the viewer devices and compare them to the ones received from the real-time fingerprint servers. When a match occurs, the fingerprint match systems may notify the viewer devices that an interactive event is to take place if there is an event identifier that corresponds to the matched video fingerprints.

As described above, automatic content recognition may be utilized across several platforms, including connected TVs from various manufacturers as well as smartphones and tablets. Since television viewing may be rapidly evolving from a single-screen experience to a multiple-screen experience, television networks may need to automatically identify the context of what a viewer is watching and the time in the program, both during a live television broadcast and in subsequent viewings such as when a program is being reproduced by a digital video recorder (DVR). In multi-screen viewing experiences, for example, companion applications on second-screen devices may also be utilized to interact with the television programming by using fingerprint technology that is available in the second-screen device or by pairing the second-screen device with the connected TV.

Having the ability to identify context and program timing may enable a network to increase audience engagement, extend viewing times, and provide program sponsors additional ways to engage with the audience, such as offering viewers personalized advertising offers or creating a second-screen experience during an advertisement break. These features may be implemented by having a central video fingerprint repository and management platform that facilitates triggering interactive events across various platforms regardless of the ACR vendor solution (e.g., fingerprinting technology). For example, an ACR system may utilize a single broadcast ACR solution to support connected TVs from multiple vendors as well as second-screen devices running companion applications.

There may be instances in which the vendors of connected TVs and supporting services are not able to associate an event with a fingerprint. Instead, those vendors may support the association of the content being viewed with a timeline. Accordingly, an ACR system may need to support timeline association in addition to event-to-fingerprint association. For timeline association, for example, the ACR system may be operable to create and provide a timeline that spans the duration of a program or show. The timeline can be distributed to the corresponding connected TVs supported by the vendors through vendor servers. With the timeline available, the connected TV can launch an event when the appropriate point in the timeline is reached.

Below are described various examples of aspects related to an ACR system that utilizes an architecture based on the abstraction layer. These exemplary aspects may comprise the system architecture, processes, APIs, and/or web-based services.

FIG. 1 is a high-level block diagram that illustrates an exemplary automatic content recognition system with abstraction layer, in accordance with an embodiment of the invention. Referring to FIG. 1, there is shown an ACR system 100 that implements an abstraction layer to support fingerprinting technology from multiple vendors. The ACR system 100 may comprise an offline fingerprint module 110, a monitor application module 115, a real-time event manager (RTEM) 120, a plurality of RTFSs 122, . . . , 124, fingerprint match systems 130, ACR-based devices 140, an applications and analytics module 150, and a timeline/event creation module 160. In some instances, at least some of the functions of the monitor application module 115 and of the RTEM 120 may be combined and may be provided by a common device or component of the ACR system 100.

The ACR system 100 may also comprise an NTP server 170 that is operable to provide synchronization to various parts of the ACR system 100 via a common reference clock. For example, the NTP server 170 may be operable to synchronize the operation of the RTEM 120 with the operation of the RTFSs 122, . . . , 124. The operations of the NTP server 170 may be based on, for example, the Internet Engineering Task Force (IETF) RFC 5905 "Network Time Protocol Version 4: Protocol and Algorithms Specification."

The offline fingerprint module 110 may comprise suitable logic, circuitry, code, and/or interfaces that may be operable to handle the offline fingerprinting portion of the operations performed by the ACR system 100. The offline fingerprint module 100 may be operable to receive pre-recorded or offline content such as commercials, programs, and promotions, for example. In this regard, the offline fingerprint module 100 may be able to ingest and process content with defined interactivity. The monitor application module 115 may comprise suitable logic, circuitry, code, and/or interfaces that may be operable to process a network television feed and the content handled by the offline fingerprint module 110 to create a real-time timeline and/or real-time event triggers. During the process, the monitor application module 115, and/or the timeline/event creation module 160, may interact with backend analytics databases that comprise user-engagement data, for example. Some of the operations that may be performed by the offline fingerprint module 110 may comprise, for example, ingest operations, storage operations, monitoring operations, and/or content version comparison operations.

The RTEM 120 may comprise suitable logic, circuitry, code, and/or interfaces that may be operable to manage real-time events based on inputs provided by one or more sources. For example, the RTEM 120 may be operable to manage real-time events based on events stored in an interactive timeline archive, a network schedule, and/or those provided by an interactive director that may assign interactive event IDs to live programming as the network television feed is being fingerprinted in real time. Moreover, the RTEM 120 may be operable to trigger interactive events in legacy systems and/or in web-based systems. The RTEM 120 may be referred to as a real-time event trigger infrastructure, for example. The RTEM 120 may comprise a real-time event inserter (RTEI) (not shown), which is operable to insert the events into the RTFSs 122 . . . 124.

In accordance with an embodiment of the invention, the RTEM 120 may be operable to instruct the monitor application module 115, and/or the timeline/event creation module 160 to record the fingerprints associated with a live program as well as to store the corresponding set of events created during the live program in the interactive timeline archive. This enables playback of the program with interactivity even after expiration of the corresponding fingerprints in the vendor's third party database. This may occur in instances when there is a re-broadcast of the live event at a subsequent date. In the case of timeline based devices, the events may be stored and timeline retrieval may be enabled even during the active window of the corresponding fingerprints since there will be no available event-to-fingerprint association.

In accordance with an embodiment of the invention, the RTEM 120 may be operable to receive one or more inputs from a user (e.g., an interactive director), and to generate based on those inputs, interactive event identifiers that can be communicated to the fingerprint servers where they can be associated with or assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HTTP live streaming (HLS), a satellite network protocol, or some other protocol.

The RTFSs 122, . . . , 124 may comprise suitable logic, circuitry, code, and/or interfaces that may be operable to handle fingerprinting and fingerprint communications to the fingerprint match systems 130. Since each vendor or television manufacturer is likely to utilize its own fingerprint technology, each of the RTFSs 122, . . . , 124 may be a dedicated server for each of the fingerprint technologies supported by the ACR system 100. In some embodiments of the invention, a portion of the RTFSs 122, . . . , 124 may be operable to perform video fingerprinting while the remaining portion of the RTFSs 122, . . . , 124 may be operable to perform audio fingerprinting or some combination thereof. Fingerprint technologies from multiple vendors may utilize different computations to perform fingerprinting of video and/or audio frames. For example, each fingerprint technology may utilize a specific set of algorithms, parameters, operations, and/or data processing methods, for example.

The fingerprint match systems 130 may comprise suitable logic, circuitry, code, and/or interfaces that may be operable to enable hosted services in the Internet for matching fingerprints produced by the RTFSs 122, . . . , 124 with fingerprints produced by the ACR-based devices 140. Each of the fingerprint match systems 130 corresponds to a particular ACR or fingerprint technology. In this regard, each of the fingerprint match systems 130 may be supported by a third party such as a TV manufacturer, for example.

The fingerprint match systems 130 may be operable to compare fingerprints produced by the ACR-based devices 140 with fingerprints provided by the RTFSs 122, . . . , 124. When matches occur, the fingerprint match systems 130 may indicate that interactive events are to take place in the ACR-based devices 140. These interactive events may allow a viewer to be presented with information on the screen or display of an ACR-based device and to interact with the device based on the information presented.

The ACR-based devices 140 may comprise a plurality of devices such as connected TVs, connected TV with paired devices (e.g., tablets), and second screen devices such as smartphones and tablets, for example. The ACR-based devices may be referred to as viewer devices, for example. Since each of the fingerprint match systems 130 supports a different ACR or fingerprint technology, those ACR-based devices 140 that support a particular fingerprint technology are operable to communicate with the corresponding fingerprint match systems 130 that support the same fingerprint technology. Moreover, when a secondary or paired device that supports a particular fingerprint technology is used, that device may also be able to communicate with the corresponding fingerprint match system 130 that supports the compatible fingerprint technology.

The applications and analytics module 150 may comprise suitable logic, circuitry, code, and/or interfaces that may be operable to provide data to the ACR-based devices 140, determine what platforms are to be served and when these platforms are to be served, handle communications with third-party partners and advertisers, handle communication with backend analytics databases, and determine unique responses for a given device request (e.g., fix targeting).

The timeline/event creation module 160 may comprise suitable logic, circuitry, code, and/or interfaces that may be operable to produce a timeline of the content in a program or show based on information provided by the monitor application module 115. The timeline/event creation module 160 may then provide the timeline created to the applications and analytics module 150 to have the timeline disseminated to the appropriate ACR-based devices 140 that may not support event-to-fingerprint association. Once the ACR-based devices 140 have the timeline for a particular program or show, they may monitor the program or show, relative to the timeline, and launch appropriate event requests when a specified point in the timeline indicates that a particular event is to take place.

Communication between the RTFSs 122, ..., 124, and the fingerprint match systems 130 may occur through one or more wireless and/or wireline communication links. Similarly, communications between the fingerprint match systems 130 and the ACR-based devices 140 and/or the applications and analytics module 150 may occur through one or more wireless and/or wireline communication links. The communication links described above may support one or more communication protocols. For example, communication protocols based on Internet Protocol (IP) may be typically used. Accordingly, the RTFSs 122, ..., 124, the fingerprint match systems 130, and the applications and analytics module 150 may comprise suitable logic, circuitry, code, and/or interfaces to enable the use of the communication protocols.

In operation, the monitor application module 115 and/or the RTEM 120 may generate and/or handle event identifiers or event triggers that correspond to specific times in a program. These event identifiers may be generated from live programming, from a network schedule, or from information provided by the offline fingerprint module 110. The event identifiers may be assigned to the appropriate fingerprints generated by the RTFSs 122, ..., 124. Since each RTFS relies on a different fingerprint technology, system synchronization is needed to appropriately assign the event identifiers to the right spot on a video and/or audio sequence. Such synchronization may be achieved by the use of a common reference clock provided by the NTP server 170.

Each of the RTFSs 122, ..., 124 may communicate the event identifiers and the fingerprints to its corresponding one of the fingerprint match systems 130. The fingerprint match systems 130 in turn receive fingerprints from their corresponding ACR-based devices 140 and try to match those fingerprints to the ones received from their corresponding RTFSs 122, ..., 124. When a match occurs, the event identifier and/or other information may be passed to the appropriate ACR-based device. With this information, the ACR-based device may obtain, for example, interactive information (e.g., graphics) from the applications and analytics module 150. For example, a connected TV may receive code or data specific for that device from a content management system (CMS) via a cloud-based content delivery network (CDN). There may be other actions performed by the user in connection with the interactive event and/or other information presented or produced in connection with the interactive event.

Figure 2A:
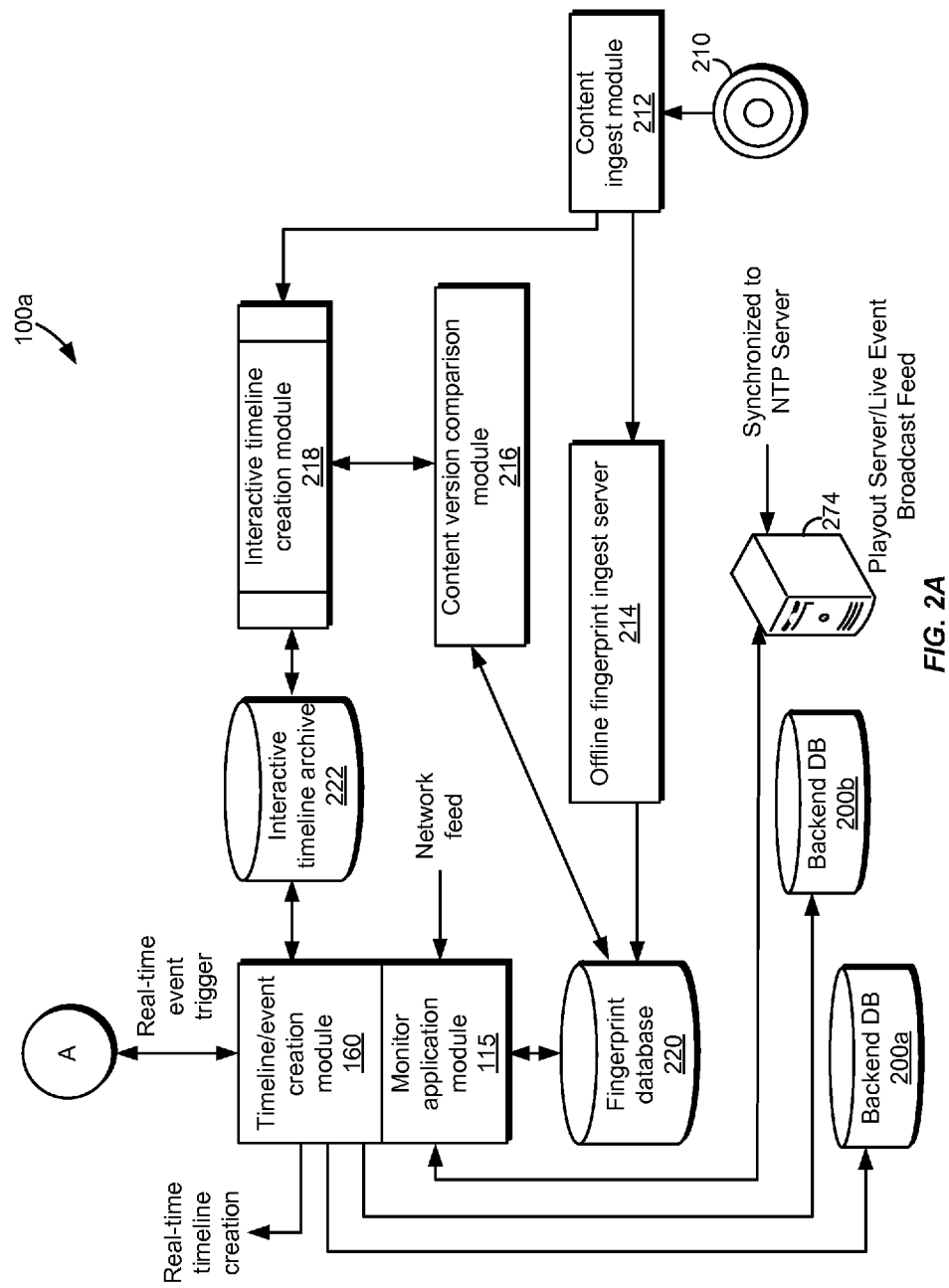
FIGS. 2A-2C are each a block diagram that illustrates details of the exemplary automatic content recognition system with abstraction layer shown in FIG. 1, in accordance with embodiments of the invention.
Figure 2B:
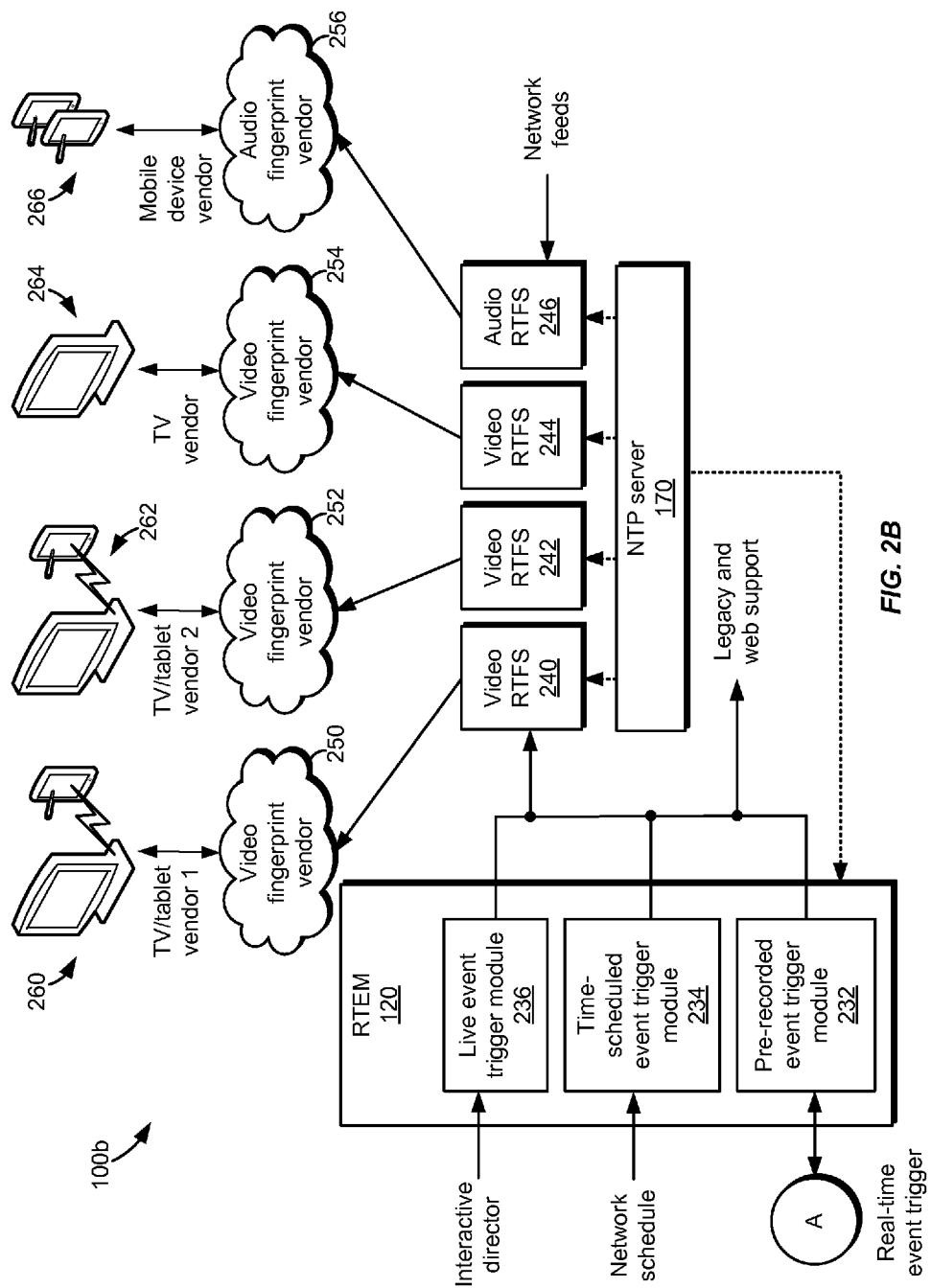
Figure 2C:
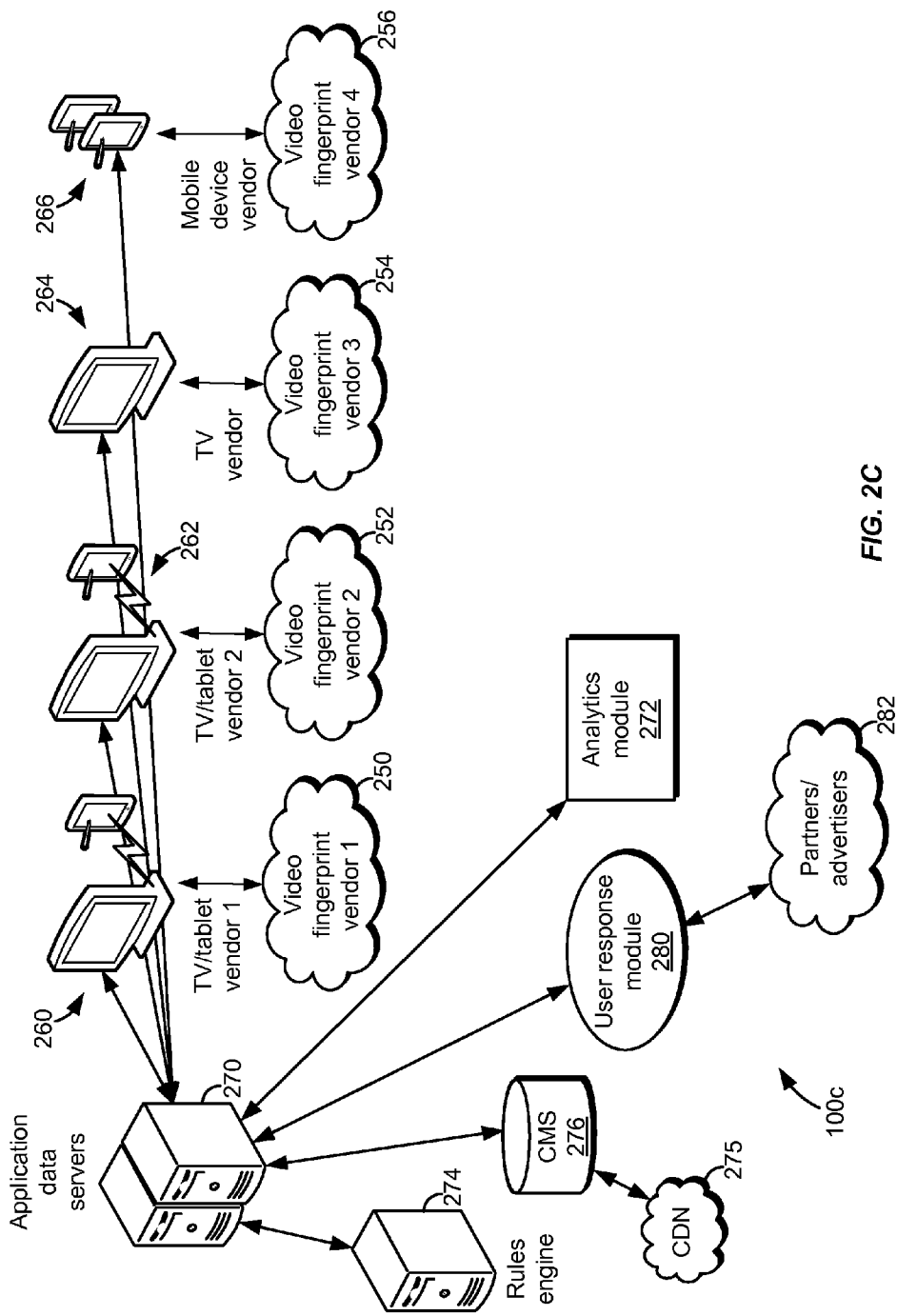

FIGS. 2A-2C are each a block diagram that illustrate details of the exemplary automatic content recognition system with abstraction layer shown in FIG. 1, in accordance with embodiments of the invention. Referring to FIG. 2A, there is shown a portion 100a of the ACR system 100 that may substantially correspond to at least portions of the offline fingerprint module 110, the monitor application 115, and the timeline/event creation module 160 described above with respect to FIG. 1. The portion 100a may comprise a content ingest module 212, an offline fingerprint ingest server 214, a content version comparison module 216, and a fingerprint database 220. The portion 100a may also comprise an interactive timeline creation module 218, an interactive timeline archive 222, the monitor application module 115, and the timeline/event creation module 160. Also shown are backend databases (DB) 200a and 200b connected to the timeline/event creation module 160 and a playout server 274 connected to the monitor application module 115.

The content ingest module 212 may comprise suitable logic, circuitry, code, and/or interfaces that may be operable to receive a media master 210, also referred to as an air master, which may comprise one or more programs, commercials, and/or promotions, for example. The content ingest module 212 may be operable to generate or create a set of proxy videos by encoding the media master 210 utilizing different resolutions. The highest quality proxy video may be provided as an input to the offline fingerprint ingest server 214 while the lowest quality proxy video may be provide to the interactive timeline creation module 218. The content ingest module 212 may also provide a content ID (CID) and other associated metadata (e.g., program data, frame number) that corresponds to the content in the media master 210.

The offline fingerprint ingest server 214 may comprise suitable logic, circuitry, code, and/or interfaces that may be operable to use a fingerprint computation or algorithm to fingerprint content and subsequently push the fingerprints for archival in the fingerprint database 220. In the offline fingerprint ingest server 214, the highest quality proxy video created by the content ingest module 212 may be fingerprinted and may be associated with the content ID and corresponding related metadata. In this regard, the offline fingerprint ingest server 214 may utilize an API to automatically ingest the media files and associated metadata from the content ingest module 212. A graphical user interface (GUI) may also be supported to manually ingest media files and to enter associated metadata.

The offline fingerprint ingest server 214 may be operable to provide a management interface for the fingerprint database 220 and/or the content version comparison module 216. For example, an API may be utilized to remove content from the fingerprint database 220. A GUI may also be supported to manually remove content from the fingerprint database 220. The offline fingerprint ingest server 214 may be operable to set priorities regarding the content to be ingested and processed. Moreover, the offline fingerprint ingest server 214 may be operable to support, among other features, the use of administration tools and the creation of reports, the ability to generate progress reports on processing content and errors, and/or recoverability after a shut down or crash.

The offline fingerprint ingest server 214 may be implemented utilizing multiple modules (not shown). These modules may be operable to perform one or more functions. Examples of those functions may comprise, without limitation, receiving the content to be fingerprinted in an input or watch folder, receiving and assigning CIDs and processing priority utilizing content ingest management tools, supporting an ACR process for writing fingerprints to the fingerprint database 220, and supporting administration tools utilized for monitoring and reporting.

The fingerprint database 220, which may also be referred to as a central fingerprint database, for example, may comprise suitable logic, circuitry, code, and/or interfaces that may be operable to store fingerprints captured by the offline fingerprint ingest server 214 and maintain the association between the captured fingerprints and a particular CID and media time.

In an embodiment of the invention, the fingerprint database 220 may support queries from multiple monitor applications 224. For example and without limitation, as many as 50 monitor applications 224 may query the fingerprint database 220. In response to a query, the fingerprint database 220 may return a CID and a media time associated with the fingerprint in a very short period of time, typically in less than one second. For example and without limitation, the return time by the fingerprint database 220 may be less than 10 milliseconds.

The fingerprint database 220 may also be operable to respond to requests from the content version comparison module 216 to identify differences between the master versions in the fingerprint database 220 and derivative works also ingested into the fingerprint database 220. For example, a movie may have different cuts or versions depending on the time of day and/or the network in which it is to be shown. The corresponding master and the derivative works may be ingested, fingerprinted, and stored in the fingerprint database 220. The interactive timeline creation module 218 may have access to the various versions of a certain work but it can identify the master version from any of the other cuts or versions. Typically, a request is initiated by the content version comparison module 216 to identify the differences (e.g., deltas) between the master and selected derivative works. A "delta" file is returned to the interactive timeline creation module 218, which incorporates the changes from the master source and automatically generates a derivative event timeline. Multiple derivative works may be compared to the master in the content version comparison module 216 to reduce the processing necessary to handle the other versions.

The fingerprint database 220 may be implemented as a distributed, fault-tolerant database that is operable to support persistent storage of fingerprints. The fingerprint database 220 may be operable to store large amounts of content fingerprints. For example and without limitation, the fingerprint database 220 may store up to 25,000 hours of content fingerprints. The number of hours of content fingerprints that can be stored may vary based on the availability of storage capacity in the fingerprint database 220.

The fingerprint database 220 may also be operable to concurrently support the reception of content from multiple offline fingerprint ingest servers 214, respond to queries from multiple monitor applications 224, and/or respond to queries from multiple content version comparison modules 216. For example and without limitation, the fingerprint database 220 may receive content from up to 10 offline fingerprint ingest servers 214. In another example and without limitation, the fingerprint database 220 may respond to queries from up to 50 monitor applications 224. In yet another example and without limitation, the fingerprint database 220 may respond to queries from up to five content version comparison modules 216. The number of requests and/or of content version comparison modules 216 that can be supported by the fingerprint database 220 may vary based on the capacity of the fingerprint database 220.

The fingerprint database 220 may be operable to support, among other features, administrative tools and report generation, management tools to report errors, and/or recoverability after a shut down or crash.

The fingerprint database 220 may be implemented utilizing multiple modules (not shown). These modules may comprise a fingerprint storage module as well as other modules that are operable to support the process of ingesting content from the offline fingerprint ingest server 214, the process of responding with a CID and media time to the monitor application module 115, and/or the process of responding to the content version comparison module 216. One or more modules may also be implemented to support administrative tools, monitoring, and/or reporting, for example.

The content version comparison module 216 may comprise suitable logic, circuitry, code, and/or interface that may be operable as a tool that enables comparison of a master version of some content to a derivative version of that same content based on fingerprints stored in the fingerprint database 220. A derivative work or piece may refer to a version of a program, promotion, or commercial, for example, that is different from a master version of that same program, promotion, or commercial. The content version comparison module 216 may return a file listing the differences between the master version and the derivative work based on a time code. The file may be provided to the interactive timeline creation module 218, for example.

The content version comparison module 216 may be operable to identify sequences that have been edited to shorten the time of handling the derivative work, the insertion of new advertisement break locations, and/or the insertion of new content. An example of the insertion of new advertisement break locations may comprise the addition of black frames of between 5 and 15 seconds. An example of the insertion of new content may occur in instances when the derivative work is the director's cut rather than the original theatrical master. The content version comparison module 216 may pass or communicate a difference file to the interactive timeline creation module 218 to be utilized for automating the creation of a new interactive timeline for a unique edit of a program based on the network, the day, and/or the time of day on which the program is to be shown.

The content version comparison module 216 may also be operable to query the fingerprint database 220 for information (e.g., fingerprints) to perform version comparison, to identify advertisement break locations based on black frames of between 5 and 15 seconds, and/or to generate an extensible markup language (XML) or similar output file that indicates the differences between a derivative piece and a master version. Moreover, the content version comparison module 216 may support, among other features, the use of administration tools and the creation of reports, the ability to generate progress reports on processing content and errors, and/or recoverability after a shut down or crash.

The content version comparison module 216 may be implemented utilizing multiple modules (not shown). These modules may be operable to perform one or more functions such as, for example, querying the fingerprint database 220 and performing file comparison. One or more modules may also be implemented to support administrative tools, for monitoring, and/or reporting, for example. The monitor application module 115 may comprise suitable logic, circuitry, code, and/or interfaces that may be operable to ingest a live broadcast television linear video feed and fingerprint the content in the feed in real time. The live broadcast television linear video feed may also be referred to as a network television feed, for example. The live broadcast television linear video feed can be based on a Serial Digital Interface (SDI) video interface and/or on a High-Definition SDI (HD-SDI) video interface. These fingerprints may be compared by the monitor application module 115 against fingerprints stored in the fingerprint database 220. When the comparison results in a fingerprint match, the fingerprint database 220 may return to the monitor application module 115 the CID and the media time of that match. The CID and the media time may then be provided to the timeline/event creation module 226. An API may be utilized to handle the communication between the monitor application module 115 and the timeline/event creation module 226.

As noted above, the monitor application module 115 may be operable to support, for example, a SDI and/or a HD-SDI for input that are provided from the broadcast chain prior to encoding and uplink. In this regard, the broadcast chain may provide the network television feed to the monitor application module 115. Other interfaces and/or formats may also be supported.

The monitor application module 115 may function so that it operates ahead of any ACR-based device or viewer device that is in the field, such as in a user's home, for example. Although the amount of time that the monitor application module 115 may be ahead from ACR-based devices in the field may vary, in a typical case the monitor application module 115 may be approximately at least 3 seconds ahead, for example.

The monitor application module 115 may be operable to query the fingerprint database 220 to determine the CID and the media time or media timeline. The monitor application module 115 may be operable to support an API that enables the monitor application module 115 to report the CID and the media time to a real-time event trigger infrastructure that is represented by the label "A" in FIG. 2A. Moreover, the monitor application module 115 may support, among other features, the use of administration tools and the creation of reports, the use of management tools for reporting errors, and/or the handling of failover/recovery operations.

The monitor application module 115 may be implemented utilizing multiple modules (not shown). These modules may comprise a module for video capture from an SDI/HD-SDI capture card, a module that provides real-time fingerprinting and querying of the fingerprint database 220, and a module that supports an API to communicate the CID, media time, and other data (e.g., duplicate CIDs, mediatime, confidence, number of seconds). One or more modules may also be implemented to support administrative tools, monitoring, and/or reporting, for example.

The timeline/event creation module 226, which may be implemented as part of the monitor application 226, may comprise suitable logic, circuitry, code, and/or interfaces that may be operable to query the interactive timeline archive 222 for events associated with the CID. The timeline/event creation module 226 may be operable to utilize the CID and the media time received by the monitor application module 115 from the fingerprint database 220 to look up event IDs in the interactive timeline archive 222. The event IDs are used to create a real-time timeline (i.e., schedule) in XML or other standard data format and real-time event triggers.

The interactive timeline creation module 218 may comprise suitable logic, circuitry, code, and/or interfaces that may be operable to utilize the proxy video generated by the content ingest module 212 and link an interactive timeline against the fingerprinted media. The interactive timeline may comprise one or more event IDs associated with a particular time in a program, commercial, or promotion. The interactive event IDs may be referred to as interactive event IDs, for example. The interactive timeline archive 222 may comprise suitable logic, circuitry, code, and/or interfaces that may be operable to store multiple interactive timelines.

In operation, the air master 210 is received and ingested by the content ingest module 212 and a proxy video is created. The highest quality proxy video generated by the content ingest module 212 may be provided to the offline fingerprint ingest server 214 while a lower quality proxy video generated by the content ingest module 212 may be provided to the interactive timeline creation module 218. The offline fingerprint ingest server 214 may fingerprint the high quality proxy video and may send the fingerprints to the fingerprint database 220 for archiving. In addition to the fingerprints, CIDs and media times may be stored in the fingerprint database 220.

The interactive timeline creation module 218 may receive the proxy video and may link event IDs that represent certain desired interactive events with the program's timeline to generate an interactive timeline. The interactive timeline may be stored in the interactive timeline archive 222.

When a derivative piece or different version from a master version is ingested, the content version comparison module 216 may compare fingerprints of the master version with fingerprints from the derivative piece to generate a difference file that is provided to the interactive timeline creation module 218. The interactive timeline creation module 218 may utilize the difference file to create an interactive timeline for the derivative piece from an interactive timeline previously generated for the master version.

The monitor application module 115 receives a network television feed and fingerprints the video content in the feed. The fingerprints generated are compared to those stored in the fingerprint database 220 to obtain CIDs media times, and potentially to act when a match is detected. The interactive timeline archive 222 may be queried to obtain event IDs associated with the CIDs. When event IDs are obtained, the timeline/event creation module 226 may generate a real-time timeline XML (or similar data format) feeds and may also generate real-time event triggers that may be communicated to a real-time event trigger infrastructure.

Referring to FIG. 2B, there is shown a portion 100b of the ACR system 100 that may comprise the RTEM 120, video RTFSs 240, 242, and 244, an audio RTFS 246, video fingerprint vendors 250, 252, and 254, and an audio fingerprint vendor 256. The number of video RTFSs and corresponding video fingerprint vendors as well as the number of audio RTFSs and corresponding audio fingerprint vendors shown in FIG. 2B are provided by way of illustration and not of limitation. More or fewer video RTFSs and corresponding video fingerprint vendors may be utilized in the ACR system 100. Similarly, the ACR system 100 may utilize more or fewer audio RTFSs and corresponding audio fingerprint vendors than those shown in FIG. 2B. The NTP server 170 of FIG. 1 is shown providing reference timing to the RTEM 120 and the RTFSs 240, 242, 244, and 246.

Also shown in FIG. 2B are various viewer devices such as connected TVs with paired devices 260 and 262, connected TVs without paired devices 264, and mobile devices 266, such as smartphones (e.g., iPhone, Android, etc.) and tablets (e.g., iPad, Samsung Galaxy, etc.). A paired device associated with the connected TVs may be a tablet, smartphone, or other like devices, for example.

The viewer devices 260 may be operable to utilize the same video fingerprinting technology (e.g., video ACR) utilized by the video RTFS 240 and supported by the video fingerprint vendor 250. The video fingerprint vendor 250 may be a vendor, manufacturer, or other third-party service provider that may comprise suitable logic, circuitry, code, and/or interfaces operable to provide hosted services over the Internet (e.g., cloud computing, etc.) for the viewer devices 260. These services may comprise video fingerprint matching as well as the delivery of any interactive event IDs associated with a match. In addition, the video fingerprint vendor 250 may provide a network television station identifier and/or network timing information (e.g., heartbeat message or NTP-based network timestamp) that may be utilized by the viewer devices 260 for ACR-related applications and/or to maintain synchronization with the network television feed. The viewer devices 260 may comprise suitable logic, circuitry, code, and/or interfaces that may be operable to take and send video fingerprints to the video fingerprint vendor 250 for matching.

The viewer devices 262 may be operable to utilize the same video fingerprinting technology utilized by the video RTFS 242 and supported by the video fingerprint vendor 252. The video fingerprinting technology utilized by the viewer devices 262 may be different from that utilized by the viewer devices 260. The video fingerprint vendor 252 may be a vendor, manufacturer, or other third-party service provider that may comprise suitable logic, circuitry, code, and/or interfaces operable to provide hosted services over the internet for the viewer devices 262. These services may comprise video fingerprint matching as well as the delivery of any interactive event IDs associated with a match. In addition, the video fingerprint vendor 252 may provide a network television station identifier and/or network timing information that may be utilized by the viewer devices 262 for ACR-related applications and/or to maintain synchronization with the network television feed. The viewer devices 262 may comprise suitable logic, circuitry, code, and/or interfaces that may be operable to take and send video fingerprints to the video fingerprint vendor 252 for matching.

The viewer devices 260 and 262 may be operable with a second device (e.g., smartphones, tablets) that may be paired to the parent device. In this regard, the second device may comprise suitable logic, circuitry, code, and/or interfaces that may be operable to take and send video and/or audio fingerprints to a corresponding video fingerprint vendor for matching or enable suitable pairing with the parent device to provide analogous functionality.

The viewer devices 264 may utilize the same video fingerprinting technology utilized by the video RTFS 244 and supported by the video fingerprint vendor 254. The video fingerprint vendor 254 may be a vendor, manufacturer, or other third-party service provider that may comprise suitable logic, circuitry, code, and/or interfaces operable to provide hosted services over the Internet for the viewer devices 264. These services may comprise video fingerprint matching as well as the delivery of any interactive event IDs associated with a match. In addition, the video fingerprint vendor 254 may provide a network television station identifier and/or network timing information that may be utilized by the viewer devices 264 for ACR-related applications and/or to maintain synchronization with the network television feed. The viewer devices 264 may comprise suitable logic, circuitry, code, and/or interfaces that may be operable to take and send video fingerprints to the video fingerprint vendor 254 for matching.

The viewer devices 266 may utilize the same audio fingerprinting technology (e.g., audio ACR) utilized by the audio RTFS 246 and supported by the audio fingerprint vendor 256. The viewer devices 266 may be referred to as second-screen devices, for example. The audio fingerprint vendor 256 may be a vendor, manufacturer, or other third-party service provider that may comprise suitable logic, circuitry, code, and/or interfaces operable to provide hosted services over the Internet for the viewer devices 266. These services may comprise audio fingerprint matching as well as the delivery of any interactive event IDs associated with a match. In addition, the audio fingerprint vendor 256 may provide a network television station identifier and/or network timing information that may be utilized by the viewer devices 260 for ACR-related applications and/or to maintain synchronization with the network television feed. The viewer devices 266 may comprise suitable logic, circuitry, code, and/or interfaces that may be operable to take and send audio fingerprints to the audio fingerprint vendor 256 for matching.

The RTFSs 240, . . . , 246 may comprise suitable logic, circuitry, code, and/or interfaces that may be operable to perform fingerprinting of content received from the network television feeds. Each video RTFS may utilize a different video fingerprinting technology or computation from that utilized by the other video RTFSs. Similarly, when more than one audio RTFS is utilized, its audio fingerprint technology or computation may be different from that utilized by the other audio RTFSs. That is, since each vendor supports a different technology for handling fingerprinting, dedicated RTFSs may be needed for each vendor and for that vendor's corresponding viewer devices. The RTFSs 240, . . . , 246 may be operable to send fingerprints, interactive event IDs, television network station identifiers, and/or network timing information to their corresponding fingerprint vendors through one or more networks (e.g., wireline networks, wireless networks) and/or by utilizing one or more communication protocols.

The RTEM 120 may comprise suitable logic, circuitry, code, and/or interfaces that may be operable to perform real-time event triggering. In this regard, the RTEM 120 may be operable to manage real-time events based on inputs from different sources. For example, the RTEM 120 may comprise a pre-recorded event trigger module 232 to provide real-time triggering from the monitor application module 115, a time-scheduled event trigger module 234 to schedule the occurrence of a trigger based on a broadcast schedule, and a live event trigger module 236, each of which is operable to handle a different type of input.

The pre-recorded event trigger module 232 may be operable to receive real-time event triggers from the timeline/event creation module 226 described above with respect to FIG. 2A. These interactive event IDs may be stored in the interactive timeline archive 222 and may be utilized by the pre-recorded event trigger module 232 to assign interactive events via defined APIs to fingerprints generated as the network television feeds are fingerprinted by the RTFSs 240, . . . , 246.

The time-scheduled event trigger module 234 may be operable to receive a network or broadcast schedule and to assign, based on the network schedule, interactive events to fingerprints generated as the network television feed is fingerprinted by the RTFSs 240, . . . , 246. The network or broadcast schedule can be in XML format or in some other structured data format, for example.

The live event trigger module 236 may be operable to received interactive event IDs assigned by an interactive director to live programming. The interactive director may be an operator that is responsible for inserting events into the live broadcast. For pre-produced content, for example, the interactive director may watch an episode and may determine when an interactive element is to take place, when to push a trivia question, when to push a fun fact, when to drive social engagement, and/or when to share a clip or post a comment. For live content, for example, the interactive director may determine when to trigger a poll question and may manage the prompting of interactive games and determine when to trigger particular questions to engage viewers in a friendly competition. For advertisement, for example, the interactive director may determine when to bring up an offer, when to prompt to prepare for interaction or interaction event, and/or determine how long to leave interactive content on screen based on frequency rules and/or time of day. When advertisement is pre-fingerprinted, for example, interactive advertisement activities may occur automatically.

The RTEM 120 may also be operable to trigger interactive events in legacy television systems and/or in web-based systems. The infrastructure provided by the RTEM 120 may support the triggering of interactive events against applications and set-top boxes (STBs) via enhanced television binary interchange format (EBIF), hypertext transfer protocol (HTTP) live streaming (HLS) via ID3 tags, and satellite delivery systems (e.g., DISH, DirectTV) via the appropriate mechanism on the corresponding STB software platform. For HLS an ID3 tag may be utilized for sending interactive event IDs, for example.

The RTEM 120 may be operable to assign interactive event IDs to particular fingerprints in a sequence of audio or video fingerprints generated by the RTFSs 240, ..., 246. The RTEM 120 may also be operable to provide television network station identifiers and/or network timing information associated with any sequence of fingerprints.

In the example shown in FIG. 2B, the RTFSs 240, ..., 246 may correspond to the RTFSs 122, ..., 124, the fingerprint vendors 250, ..., 256 may correspond to the fingerprint match systems 130, and the viewer devices 260, ..., 266 may correspond to the ACR-based devices 140, which are illustrated in FIG. 1.

In operation, the RTEM 120 may generate and/or handle one or more interactive event IDs that correspond to a particular set of fingerprints generated by the RTFSs 240, ..., 246. The RTEM 120 may have determined the interactive event IDs based on live event inputs, time-scheduled event inputs, and/or pre-recorded event inputs. The RTEM 120 may assign or associate the interactive event IDs to their appropriate fingerprints based on the synchronization of its operation to the operation of the RTFSs 240, ..., 246 via broadcast NTP. The RTEM 120 may also provide television network station identifiers and/or network timing information to the RTFSs 240, ..., 246. The RTFSs 240, ..., 246 may communicate the fingerprints, interactive event IDs, the television network station identifiers, and/or the network timing information to their corresponding fingerprint vendors.

The client or viewer devices may take and send fingerprints to their corresponding fingerprint vendors, which in turn determine whether there is a match with the fingerprints received from the RTFSs. Upon detection or determination of a match, the fingerprint vendors may return to the viewer device various pieces of information, including but not limited to network timing information and any interactive event ID that is triggered as a result of the match.

The portion 100b in FIG. 2B may illustrate the implementation of an abstraction layer that enables the ACR system 100 to assign the same interactive event identifiers to different sets of video and/or audio fingerprints that are generated from different fingerprint technologies. That is, by appropriately timing the assignment of interactive event identifiers to multiple sequences of fingerprints that are generated from the same video content but with different fingerprinting technologies, the ACR system 100 may be able to support fingerprinting technologies from multiple vendors. Such implementation may provide flexibility by enabling a vendor to update its fingerprinting technology without affecting other fingerprinting technologies. Moreover, the architecture of the ACR system 100 may provide scalability by enabling new or additional fingerprint technologies from other vendors or from the same vendors to be added and supported.

Referring to FIG. 2C, there is shown a portion 100c of the ACR system 100 that may comprise the viewer devices 260, ..., 266 and the fingerprint vendors 250, ..., 256 shown in FIG. 2B. Also shown are application data servers 270, an analytics module 272, a rules engine 274, a cloud-based content delivery network (CDN) 275, and a content management system (CMS) 276. In addition, FIG. 2C shows a user response module 280 and third-party partners/advertisers 282.

The application data servers 270 may comprise suitable logic, circuitry, code, and/or interfaces that may be operable to receive from a viewer device information related to an interactive event ID, a network television station, fingerprinted broadcast time, CID and additional data, and/or a device type. The information may be provided by the viewer device in response to a match between a fingerprint taken by the device and a fingerprint taken by the corresponding RTFS. Once a match occurs and the viewer device obtains the appropriate information from its corresponding fingerprint vendor, the viewer device may communicate the information to the application data servers 270, which in turn returns the appropriate content that corresponds to the interactive event ID and related data in a callback. Content may be pushed to a second screen or device paired with a connected TV that is logged in to an appropriate application or Web page.

The application data servers 270 may be operable to send information to the analytics module 272 as to what kind of interactions (e.g., clicks, selections, options, viewing behavior on a given broadcaster's network) are taking place in a viewer device. The application data servers 270 may be operable to handle the flow of user response data with third-party partners and/or advertisers 282. The user response data may comprise, but need not be limited to, TV IDs, coupon IDs, and event IDs, for example. Communication of the user response data between the application data servers 270 and the third-party partners/advertisers 282 may be handled by the user response module 280, for example. The application data servers 270 may be operable to call the CMS 276 for text, banners, graphics, overlays, and/or video, for example.

The application data servers 270 may also be operable to deliver event schedules to viewer devices, to deliver correct content uniform resource locator (URL) based on the type of viewer device, to integrate with a variety of back-end systems, to integrate with polling servers (not shown), to integrate with gaming services such as leader boards, and/or to integrate with customer databases such as those used in connection with store user preferences and social circle members, for example. With respect to integrating with back-end systems, the application data servers 270 may, for example, integrate with social networks for storage of tweets for later playback and/or to filter comments and push back to applications.

The rules engine 274 may comprise suitable logic, circuitry, code, and/or interfaces that may be operable to determine which platforms (e.g., viewer devices) are to be served and when are those platforms to be served by the application data servers 270. The rules engine may be preconfigured and/or dynamically configured.

The CMS 276 may comprise suitable logic, circuitry, code, and/or interfaces that may be operable to store the content that is delivered to the viewer devices. For example, content that may be delivered may comprise text, banners, graphics, overlays, and video. Other examples of content may comprise polls and fun facts, clips to share, games and trivia, and advertising content. These examples are provided by way of illustration and not of limitation. Accordingly, other examples of contents that may be utilized for user interactive events with the viewer devices may also be stored in the CMS 276.

The CMS 276 may comprise suitable logic, circuitry, code, and/or interfaces that may be operable to enable communication between the application data servers 270 and the CDN 275. The CMS 276 is operable to post assets to the CDN 275. ACR-based devices are operable to download the assets (graphics, banners, overlays, video, etc) from the CDN 275.

The analytics module 272 may comprise suitable logic, circuitry, code, and/or interfaces that may be operable to receive user interaction information from the application data servers 270 or directly from the viewing devices. The analytics module 272 may comprise one or more back-end databases to store, mange, and/or process user information.

In operation, content may be provided by the application data servers 270 to one of the viewer devices 260, . . . , 266 in response to receiving an interactive event ID, a network television station, device type, and other data from that viewer device. Rules regarding which viewer device is to be served, and when the device may be served, may be determined by the rules engine 274. The content to be served by the application data servers 270 to the viewer device may be stored in the CMS 276.

The analytics module 272 may determine which viewers are interacting with content and what those viewers are watching based on information received from the application data servers 270 or directly from the viewing devices. Viewer responses that result from interactive events may be handled by the user response module 280, which in turn communicates with third-party partners/advertisers 282.

The third-party partners/advertisers 282 may comprise and/or be connected to advertisement servers and/or one or more fulfillment systems. The advertisement servers may be utilized to deliver advertisement overlays to ACR-based applications running on viewer devices. The advertisement servers may also be operable to support the tracking of user impressions and click-throughs and/or to perform other advertising-related functions.

The fulfillment systems may utilize one or more technologies to fulfill viewer requests that occur in connection with ACR-based applications and user interaction. Examples of such technologies may comprise, but need not be limited to, coupon delivery technologies, technologies for movie ticket purchases and delivery, and/or short message service/multimedia messaging service (SMS/MMS) gateways.

Figure 3:
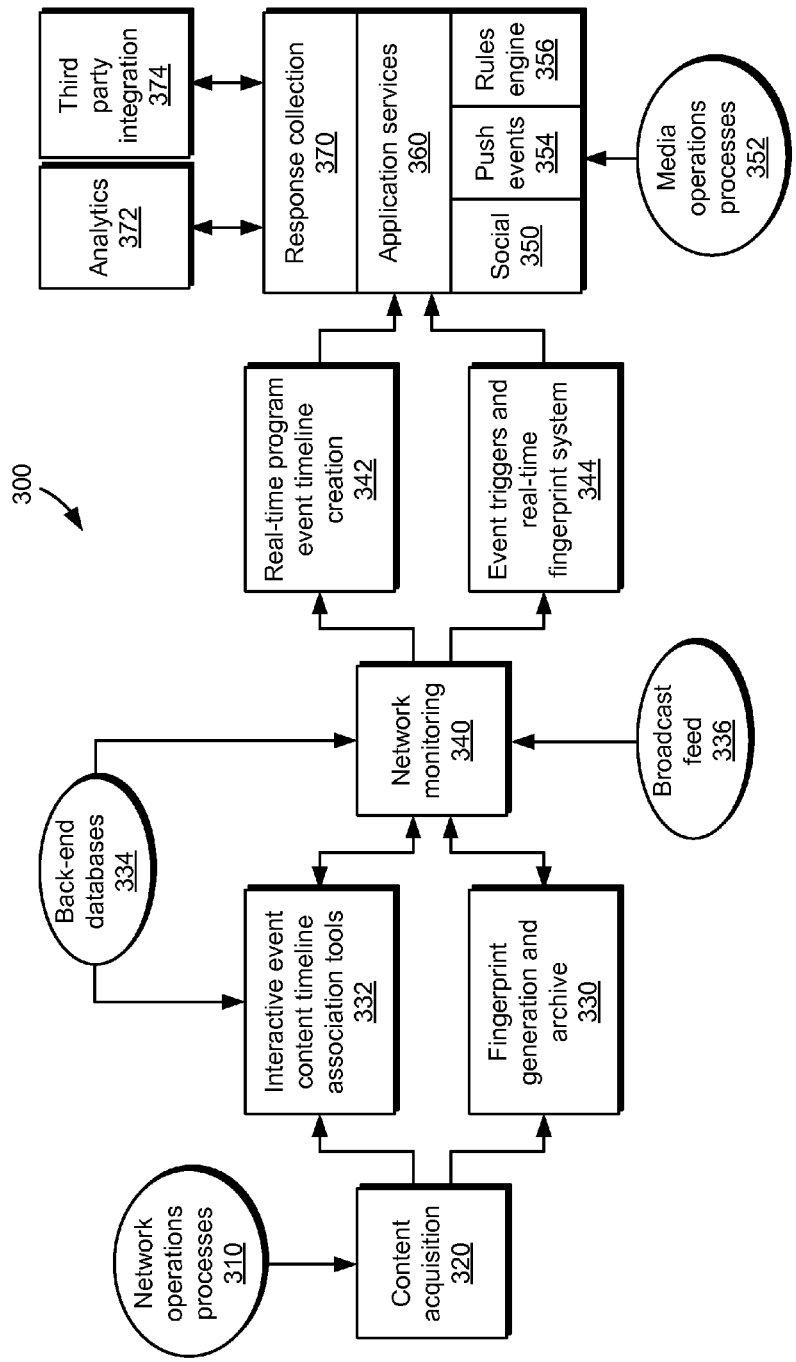
FIG. 3 is a high-level functional of an exemplary work flow for an automatic content recognition with an abstraction layer, in accordance with an embodiment of the invention.

FIG. 3 is a high-level functional diagram of an exemplary work flow for an automatic content recognition with an abstraction layer, in accordance with an embodiment of the invention. Referring to FIG. 3, there is shown a work flow 300 that illustrates the high-level functions of the ACR system 100 described above with respect to FIGS. 1-2C. In the work flow 300, at step 310, television network operations may generate or produce air masters or other similar reference content for various programs, promotions, and/or commercials. At step 320, the content may be ingested by a content acquisition operation, which may be performed by, for example, the content ingest module 212. At step 330, the content, which may be processed into a proxy video at step 320, may be reference fingerprinted and archived. The fingerprinting may be performed by, for example, the offline fingerprint ingest server 214, and the archiving may be performed by, for example, the fingerprint database 220.

At step 332, the proxy video may be utilized by a series of interactive event content timeline association tools to produce and archive interactive timelines. The tools may be, for example, the interactive timeline creation module 218 and/or the content version comparison module 216. The archiving may be performed by, for example, the interactive timeline archive 222.

At step 334, back-end databases may be utilized to perform the operations corresponding to steps 332 and 340. These back-end databases may include content management systems for content timelines and shows schedule/timeline information for network monitoring.

At step 336, a broadcast feed may be generated, which may comprise at least some of the content ingested during the content acquisition operations in step 320. The broadcast feed may be a network television feed, for example. At step 340, the broadcast feed may be monitored by, for example, the monitor application module 115. The output from the network monitoring may be provided to step 342, where real-time program event timeline creation (e.g., XML file creation) may be performed by, for example, the timeline/event creation module 226. The output from the network monitoring may also be provided to step 344, where event triggers may be generated by, for example, the timeline/event creation module 226.

At step 344, the set of RTFSs 240, . . . , 246, for example, may receive the event triggers and may assign interactive event IDs to fingerprints generated by multiple fingerprint servers. The interactive event IDs and other information may be communicated by the fingerprint servers to corresponding fingerprint match systems such as the fingerprint vendors 250, . . . , 256, for example.

At step 350, social and other like networks may be integrated with application data services such as those provided by the application data servers 270. At step 352, the television network media operations may provide push events, which in turn may be provided to or integrated with the application data servers 270 at step 354. Moreover, at step 356, rules from, for example, the rules engine 274 may be provided to the application data servers 270.

At step 360, the real-time program event timeline from step 342 and/or the output from step 344 may be received by the application data servers 270 to perform application services such as those described above with respect to FIG. 2C. The application services at step 360 may be integrated with response collection operations at step 370. At step 372, collected responses and user information may be analyzed by, for example, the analytics module 272. Moreover, the collected responses may be processed by third-parties such as the third-party partners/advertisers 282, for example. In this regard, the functions and/or services provided by the third-party partners/advertisers 282 may be integrated with the application services in step 360.

Figure 4A:
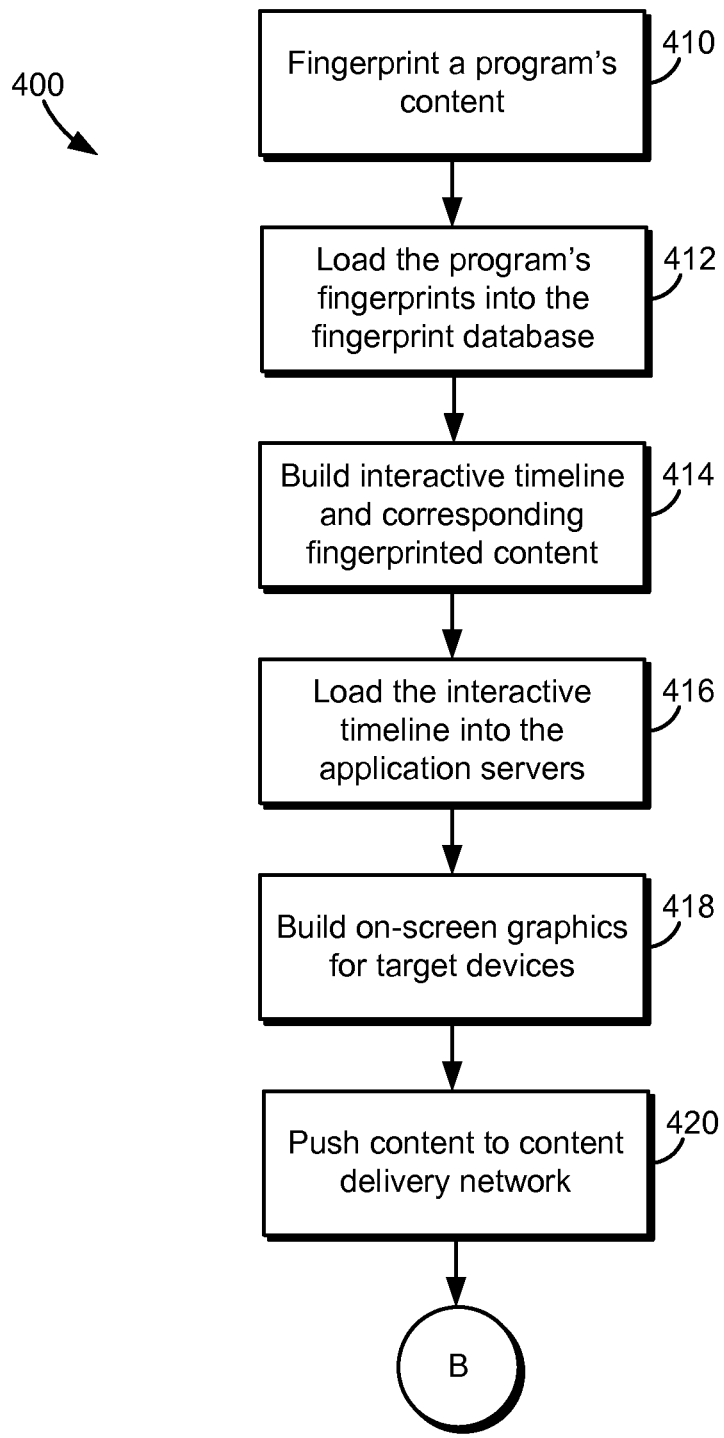
FIGS. 4A-4C are each a flow diagram that illustrates exemplary steps in the operation of an automatic content recognition system with an abstraction layer, in accordance with embodiments of the invention.
Figure 4B:
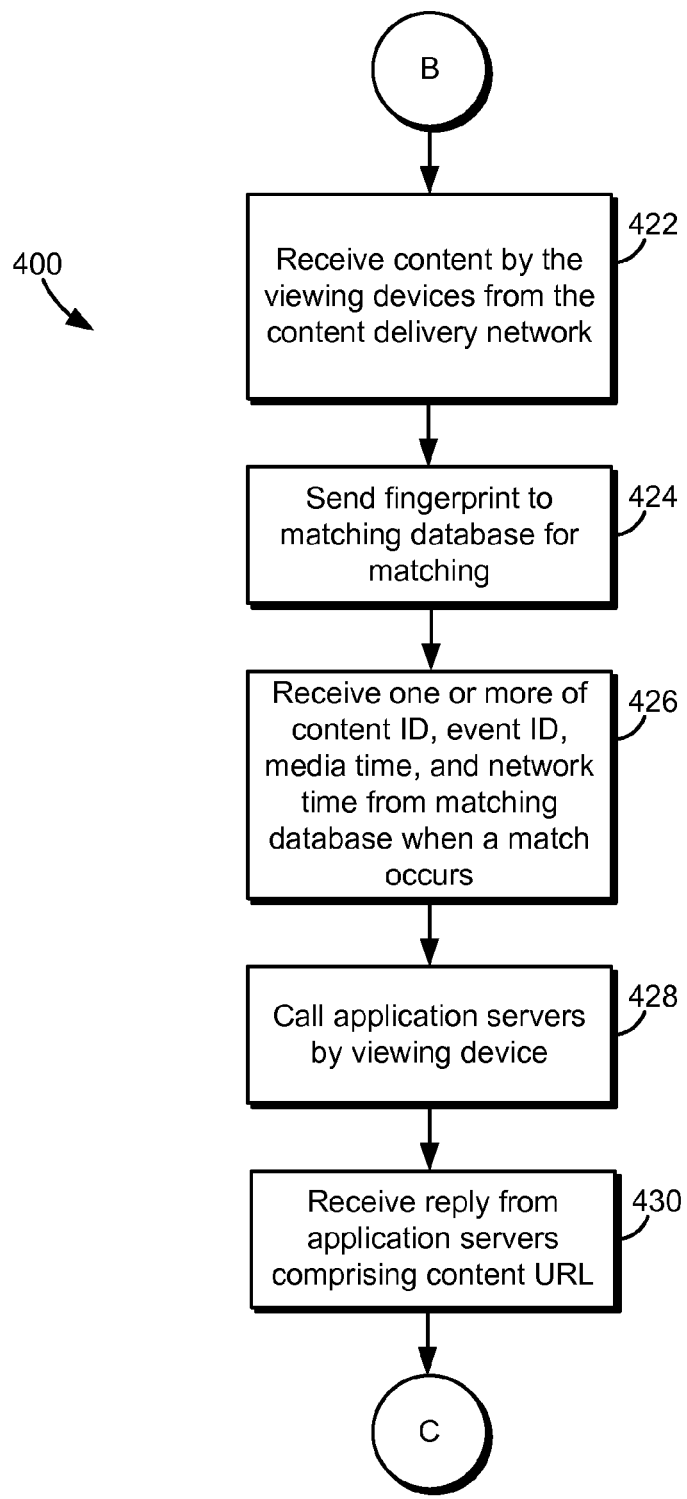
Figure 4C:
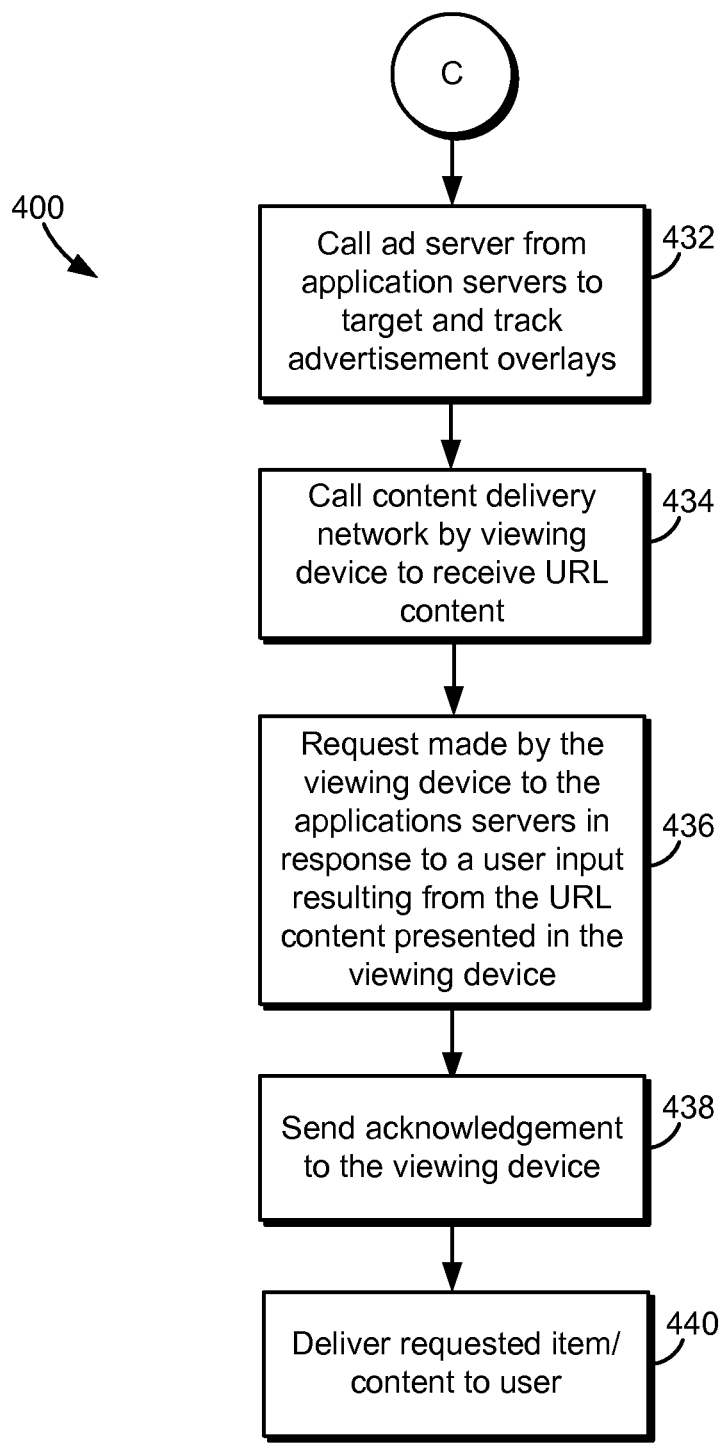

FIGS. 4A-4C are each a flow diagram that illustrates exemplary steps in the operation of an automatic content recognition system with an abstraction layer, in accordance with embodiments of the invention. Referring to FIG. 4A, there is shown a portion of a flow chart 400 in which, at step 410, a program or other type of content may be fingerprinted utilizing a pre-determined fingerprinting technology or computation. The fingerprinting may be performed by, for example, the offline fingerprint ingest server 214.

At step 412, the program's fingerprints may be loaded or stored into a fingerprint database such as the fingerprint database 220, for example. At step 414, an interactive timeline and corresponding fingerprint content may be built. In this instance, the interactive timeline creation module 218, the interactive timeline archive 222, and/or the timeline/event creation module 226 may be utilized to generate an XML file, for example, which may comprise the interactive timeline information. At step 416, the interactive timeline built in step 414 may be loaded or stored into application servers, such as the application data servers 270, for example.

At step 418, on-screen graphics for different target viewer devices (e.g., ACR-based devices 140, viewer devices 260, . . . , 266) may be built. For example, some of the viewer devices may support Shock Wave Flash or Small Wave Format (SWF)

files. This type of files may be utilized in multimedia and vector graphics and may comprise animations or applets with different levels of interactivity and function. In another example, some of the viewer devices may support Hyper Text Markup Language 5 (HTML5), which is a language that allows the structuring and presentation of content in the World Wide Web. At step 420, on-screen graphics and content for use with a fingerprinted asset may be pushed to a content delivery network utilized by the network television station for distribution.

Referring to FIG. 4B, there is shown another portion of the flow chart 400 after step 420. At step 422, the viewer devices may receive the content from the content delivery network and may take fingerprints of the content. At step 424, the viewer devices may send the fingerprints to a third-party database for matching. The third-party database may be part of the fingerprint match systems 130 shown in FIG. 1 or part of the fingerprint vendors 250, . . . , 256 shown in FIGS. 2B and 2C, for example.

At step 426, when a match occurs, the third-party database may return to the viewer devices a combination of a content identifier (CID) that may be representative of the program or network being watch, an interactive event ID that may be representative of an interactive event that is being triggered, a media time that may be representative of a time in the program corresponding to the interactive event, and a network time that may be representative of a benchmark or reference network time such as a network time utilized by an NTP server (e.g., NTP server 170) to synchronize network operations. The benchmark or reference network time may be referred to as a network timestamp, for example. Moreover, the event trigger information described above may be provided by one or more components used to enable the abstraction layer such as the monitor application module 115, for example.

At step 428, the viewer device may utilize the information received from the third-party database to call application servers such as the application data servers 270. Depending on the type of viewer device (e.g., different manufacturers, models), the call made by the viewer device may comprise different information. For example, for a first device type, the call to the application servers may comprise CID and device type information. In another example, for a second device type, the call to the application servers may comprise the interactive event ID and the device type.

At step 430, the viewer device may receive a reply from the application servers. The reply may comprise a content URL that is appropriate for the type of viewer device. For example, for a first type of viewer device the application servers may return the URL of the SWF, while for a second type of viewer device the application servers may return the URL of an HTML5 page. The application servers may also return event timeline information to the various types of viewer devices.

Referring to FIG. 4C, there is shown yet another portion of the flow chart 400 after step 430. At step 432, the application servers may call an advertisement server or ad server to target and track advertisement overlays. At step 434, a viewer device may call the content delivery network to receive the content URL. The content delivery network may return the URL for the content, which may be a SWF or HTML page based on the type of viewer device.

At step 436, the requests made by a user of the viewer device may result in additional step or operations. For example, a user may request a coupon or other type of reward in response to content displayed on the user's viewer device as a result of an interactive event. In this instance, the viewer device may call the application servers as part of the request.

At step 438, the application servers may send an acknowledgement or ACK to the viewer device in response to the request. At step 440, the application servers may call an MMS gateway or some other type of fulfillment mechanism to deliver the coupon or reward to the user. The delivery may be made to the viewer device, to another device, to an electronic account (e.g., email, etc.), or to another device/account that the user identifies as a preferred place for receiving the coupon or reward.

Figure 5B:
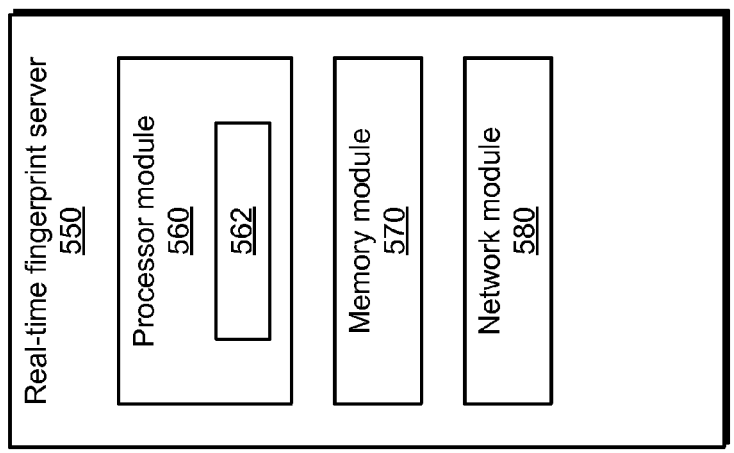
FIG. 5B is a block diagram that illustrates an exemplary real-time fingerprint server, in accordance with an embodiment of the invention.
Figure 5A:
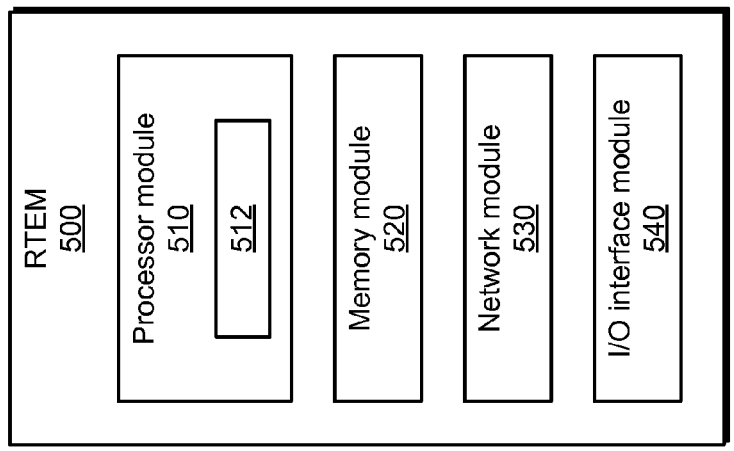
FIG. 5A is a block diagram that illustrates an exemplary real-time event manager (RTEM), in accordance with an embodiment of the invention.

FIG. 5A is a block diagram that illustrates an exemplary real-time event manager, in accordance with an embodiment of the invention. Referring to FIG. 5A, there is shown a real-time event manager (RTEM) 500 that may correspond to the RTEM 120 described above. The RTEM 500 may comprise a processor module 510, a memory module 520, a network module 530, and an input/output (I/O) interface module 540.

The processor module 510 may comprise suitable logic, circuitry, code, and/or interfaces that may be operable to perform the operations, functions, processes, computations, and the like described herein with respect to the RTEM 120. In this regard, the processor module 510 may be operable to enable an abstraction layer utilized for supporting fingerprint technologies from different vendors.

The processor module 510 may be operable to handle events such as live events, time-scheduled events, and pre-recorded events. The processor module 510 may be operable to assign interactive event IDs or similar information to video and/or audio fingerprints generated by one or more RTFSs. Moreover, the processor module 510 may be operable to handle network timing information for synchronizing the operation of the RTFSs.

The processor module 510 may comprise at least one processing device 512. The processing device 512 may be a central processing unit (CPU), a digital signal processor (DSP), and/or other type of integrated circuit that may be utilized to perform data processing operations.

The memory module 520 may comprise suitable logic, circuitry, code, and/or interfaces that may be operable to store information utilized to enable the abstraction layer. The network module 530 may comprise suitable logic, circuitry, code, and/or interfaces that may be operable to allow the RTEM 500 to communicate with one or more RTFSs and/or with an offline infrastructure such as the offline fingerprint module 110 described above with respect to FIG. 1. The network module 530 may be operable to support one or more communication protocols such as wireline protocols and/or wireless protocols. The network module 530 may be operable to receive information related to time-scheduled events and/or pre-recorded events.

The I/O interface module 540 may comprise suitable logic, circuitry, code, and/or interfaces that may be operable to interact with one of more sources of interactive events information such as an interactive director, for example.

FIG. 5B is a block diagram that illustrates an exemplary real-time fingerprint server or RTFS, in accordance with an embodiment of the invention. Referring to FIG. 5B, there is shown an RTFS 550 that may correspond to one of the RTFSs 122, . . . , 124 or one of the RTFSs 240, . . . , 246 described above. The RTFS 550 may comprise a processor module 560, a memory module 570, and a network module 580.

The processor module 560 may comprise suitable logic, circuitry, code, and/or interfaces that may be operable to perform the operations, functions, processes, computations, and the like described herein with respect to the RTFSs 122, . . . , 124 and the RTFSs 240, . . . , 246. In this regard, the processor module 560 may be operable to perform fingerprinting operations for a vendor-specific technology that may be provided for broadcasting to the network module 580, for example. Because the processor module 560 or other similar module in one of the RTFSs may perform vendor-specific fingerprinting operations that are different from those in other RTFSs, the use of an abstraction layer at a real-time event trigger infrastructure can enable a simplified implementation of an ACR system capable that supports multiple RTFSs with different vendor-specific technologies.

The processor module 560 may be operable to perform ACR or fingerprinting computations on a network television feed for audio and/or video fingerprinting. In this regard, the processor module 560 may be operable to handle frame-by-frame fingerprinting operations, for example. Moreover, the processor module 560 may be operable to handle network timing information for synchronizing the operation of the RTFS 550 with that of a network time protocol server such as the network time protocol server 500.

The processor module 560 may comprise at least one processing device 562. The processing device 562 may be a CPU, a DSP, and/or other type of integrated circuit or ASIC that may be utilized to perform data processing operations.

The memory module 570 may comprise suitable logic, circuitry, code, and/or interfaces that may be operable to store information utilized to enable the abstraction layer. The memory module 570 may be operable to store information generated in connection with fingerprinting computations.

The network module 580 may comprise suitable logic, circuitry, code, and/or interfaces that may be operable to allow the RTFS 550 to communicate with a corresponding one of the fingerprint match systems 130 or with a corresponding one of the fingerprint vendors 250, . . . , 256 described above. The network module 580 may also be operable to support communication between the RTFS 550 and a network time protocol server such as the network time protocol server 500. The network module 580 may support one or more communication protocols such as wireline protocols and/or wireless protocols.

Figure 6:
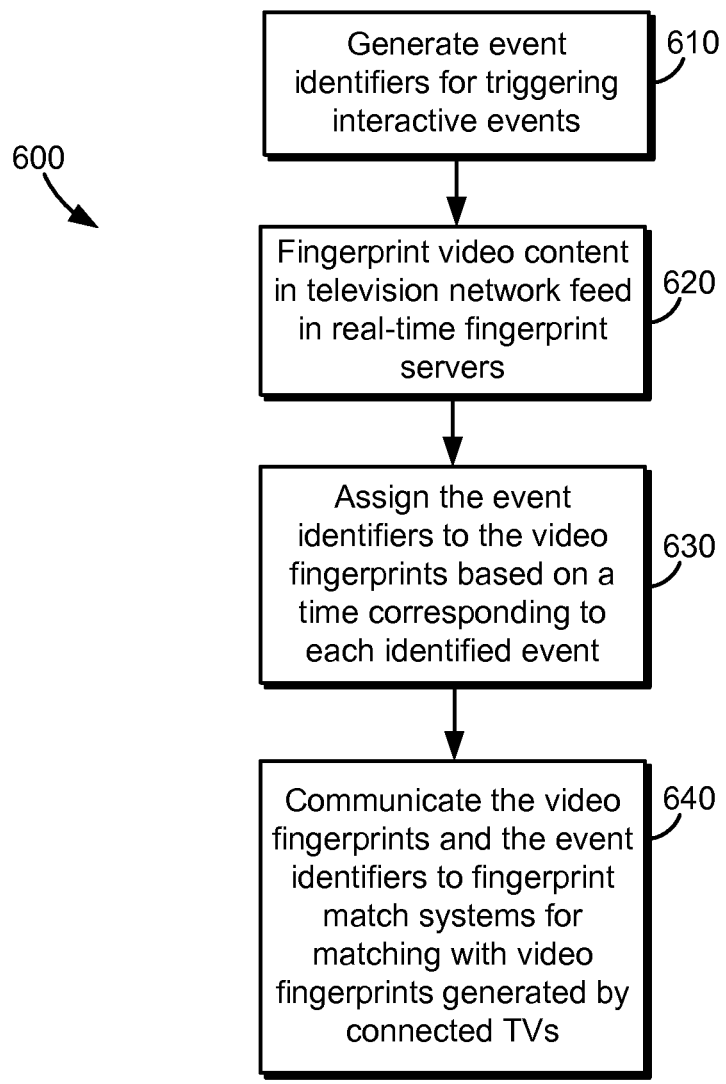
FIG. 6 is a flow diagram that illustrates exemplary steps in the generation and assignment of event identifiers for triggering interactive events in an automatic content recognition system with an abstraction layer, in accordance with an embodiment of the invention.

FIG. 6 is a flow diagram that illustrates exemplary steps in the generation and assignment of event identifiers for triggering interactive events in an automatic content recognition system with an abstraction layer, in accordance with an embodiment of the invention. Referring to FIG. 6, there is shown a flow chart 600 in which, at step 610, a system such as the ACR system 100, may generate or determine event identifiers for triggering interactive events. The event identifiers may be handled by a real-time event trigger infrastructure such as the RTEM 120, for example.

The system may comprise multiple fingerprint servers communicatively coupled to the network time server. At step 620, each of the fingerprint servers may be operable to generate video fingerprints in real time from a network television feed. Moreover, each of the fingerprint servers may utilize a video fingerprint computation that may be different from a video fingerprint computation utilized by any of the other fingerprint servers. The fingerprint servers may correspond to those RTFSs from the RTFSs 122, . . . , 124 that support video fingerprinting or the RTFSs 240, . . . , 244.

At step 630, the RTFSs may assign one or more of the interactive event identifiers to the video fingerprints generated by each of the fingerprint servers. The assignment may be based on a time corresponding to each identified interactive event.

At step 640, the fingerprint servers may communicate the video fingerprints and the assigned interactive event identifiers to a corresponding one of several fingerprint match systems. Each of the fingerprint match systems may be operable to communicate with a plurality of devices (e.g., viewer devices 260, . . . , 264) that utilize the same video fingerprint computation utilized by the fingerprint server that corresponds to that fingerprint match system. Examples of the fingerprint match systems may be those of the fingerprint match systems 130 that are operable to support video fingerprints or the fingerprint vendors 250, 252, and 254.

In another embodiment of the invention, the ACR system 100 may comprise, in addition to the fingerprint servers, an audio server. The audio server may be operable to generate audio fingerprints in real time from the network television feed. The audio fingerprints may be generated utilizing an audio fingerprint computation. The monitor application module 115 and/or the RTEM 120, for example, may be operable to trigger one or more interactive event identifiers and corresponding data against the RTFS for real time association with audio fingerprints from the specified broadcast network. The assignment may be based on a time corresponding to each identified interactive event. The RTEM 120 may be operable to receive one or more inputs from a user (e.g., an interactive director), and to generate based on those inputs, a real-time timeline that comprises the interactive event identifiers assigned to the video fingerprints generated by the fingerprint servers. The RTEM 120 may be operable to communicate the interactive event identifiers to a television system (e.g., legacy system) and/or to a web system. The interactive event identifiers may be utilized in the television system and/or in the web system to trigger interactive events. Moreover, the communication of the interactive event identifiers may be based on one or more of an EBIF, an HLS, a satellite network protocol, or some other protocol.

The audio server may communicate the audio fingerprints and the assigned one or more interactive event identifiers to an additional fingerprint match system that is operable to communicate with a plurality of devices that utilize the same audio fingerprint computation utilized by the audio server. An example of the audio server may be the audio RTFS 246 or one of the RTFSs 122, . . . , 124 that is operable to provide audio fingerprinting. An example of the additional fingerprint match system may be the audio fingerprint vendor 256 or one of the fingerprint match systems 130 that is operable to support audio fingerprints.

In another aspect of the embodiment of the invention, the monitor application module 115, for example, may generate video fingerprints in real time from the network television feed. The offline fingerprint module 110 may be operable to compare the generated video fingerprints to video fingerprints generated from pre-recorded content and to determine the one or more interactive event identifiers based on the comparison. The network television feed may comprise network time reference information utilized to synchronize the interactive event identifiers with the video fingerprints generated by the fingerprint servers.

The offline fingerprint module 110 may be operable to generate a timeline from the pre-recorded content. The timeline may comprise interactive event identifiers, each of which corresponds to a particular time in the timeline. The offline fingerprint module 110 may be operable to determine from the interactive event identifiers in the timeline, and based on the comparison described above, the interactive event identifiers assigned to the video fingerprints generated by the fingerprint servers.

The offline fingerprint module 110 may be operable to determine a version of the pre-recorded content. The offline fingerprint module 110 may be operable to generate the timeline of the pre-recorded content based on the version of the pre-recoded content, video fingerprints generated from a master (e.g., air master) of the pre-recorded content, and a timeline generated from the master of the pre-recorded content.

In another aspect of the embodiment of the invention, the fingerprint servers may be operable to generate message (e.g., heartbeat messages) comprising network time reference information. The messages may be communicated to the fingerprint match systems, which in turn may communicate the information in the messages to their corresponding viewer devices. The network time reference information may be referred to as a network timestamp, for example.

In another embodiment of the invention, the RTEM 120 and/or the video RTFSs may be operable to receive one or more interactive event identifiers from one or more sources and assign to different sets of video fingerprints the one or more interactive event identifiers. A different set of video fingerprints may be generated from a network television feed by each respective video RTFS, each of which supports a different video fingerprint technology. The RTEM 120 and/or the audio RTFS may also assign to the one or more interactive event identifiers, a set of audio fingerprints generated by the audio RTFS. The assignment of the interactive event identifiers to the different sets of video and/or audio fingerprints may be based on a time corresponding to each identified interactive event. The network television feed may comprise network time reference information (e.g., timestamps) utilized to synchronize the one or more interactive event identifiers to the different sets of video fingerprints. In this regard, the synchronization can occur by having time association based on using NTP server-to-fingerprint association.

In another aspect of the invention, the monitor application module 115 may generate a set of video fingerprints in real time from the network television feed. The monitor application module 115, the fingerprint database 220, the timeline/ event creation module 226 and/or the interactive timeline archive 222 may be utilized to compare the generated set of video fingerprints to a set of video fingerprints generated from pre-recorded content, and to determine at least a portion of the interactive event identifiers based on the comparison. Moreover, a timeline may be generated from the pre-recorded content, where the timeline may comprise a plurality of interactive event identifiers, each of which corresponds to a particular time in the timeline. At least a portion of the interactive event identifiers assigned to the different sets of video fingerprints may be determined from the interactive event identifiers in the timeline and based on the comparison.

In another aspect of the invention, the content version comparison module 216 may be utilized to determine a version of the pre-recorded content. The timeline of the pre-recorded content may be generated based on one or more of the version of the pre-recoded content, a set of video fingerprints generated from a master of the pre-recorded content, and a timeline generated from the master of the pre-recorded content.

In another aspect of the invention, the live event trigger module 236 in the RTEM 120 may be operable to receive one or more inputs from a user and to generate, based on the one or more inputs, a portion of the one or more interactive event identifiers assigned to the different sets of video fingerprints (by the respective RTFS's). The time-scheduled event trigger module 234 in the RTEM 120 may also be operable to receive a network television schedule and to generate, based on the network television schedule, at least a portion of the one or more interactive event identifiers assigned to the different sets of video fingerprints (by the respective RTFS's).

The video RTFSs 240, 242, and 244, as well as to the audio RTFS 246, can all be synchronized using an NTP server. The RTEM 120 may also be operable to communicate to one or both of a television system (e.g., legacy system) and web based systems the interactive event identifiers to trigger interactive events in those systems. The communication may be performed via EBIF event triggers on legacy cable systems, ID3 tags on web and connected devices supporting the HLS (Http Live Streaming) protocol, and satellite network iTV protocols used by NDS and Echostar, for example.

Another embodiment of the invention may provide a non-transitory machine and/or computer readable storage and/or media, having stored thereon, a machine code and/or a computer program having at least one code section executable by a machine and/or a computer, thereby causing the machine and/or computer to perform the steps as described herein for an automatic content recognition abstraction layer.

Accordingly, the present invention may be realized in hardware, software, or a combination of hardware and software. The present invention may be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   in a real-time event manager:
      receiving one or more interactive event identifiers from one or more sources, wherein the one or more interactive event identifiers are utilized to trigger one or more interactive events; and
      triggering timing of assignment of the one or more interactive event identifiers to different sets of video fingerprints, wherein:
         a different set of video fingerprints is generated from same portions of a network television feed by a respective one of a plurality of fingerprint servers;
         each of the plurality of fingerprint servers utilize a video fingerprint technology that is different from a video fingerprint technology utilized by any of the other fingerprint servers; and identical interactive event identifiers are assigned to the different set of video fingerprints that are generated from the same portions of the network television feed by the different fingerprint technologies.

2. The method according to claim 1, comprising assigning to a set of audio fingerprints the one or more interactive event identifiers, the set of audio fingerprints being generated from the network television feed by an audio server utilizing an audio fingerprint technology.

3. The method according to claim 2, wherein the audio server is operable to communicate the audio fingerprints and the assigned one or more interactive event identifiers to a corresponding fingerprint match system, the fingerprint match system being operable to communicate with a plurality of devices that utilize the same audio fingerprint technology utilized by the audio server.

4. The method according to claim 1, comprising synchronizing the real-time event manager to the plurality of fingerprint servers using a network time protocol reference clock.

5. The method according to claim 1, comprising:
generating in a monitor application module communicatively coupled to the real-time event manager, a set of video fingerprints in real time from the network television feed;
comparing the generated set of video fingerprints to a set of video fingerprints generated from pre-recorded content; and
determining at least a portion of the interactive event identifiers based on the comparison.

6. The method according to claim 5, comprising:
generating a timeline from the pre-recorded content, the timeline comprising a plurality of interactive event identifiers, each of which corresponds to a particular time in the timeline; and
determining from the plurality of interactive event identifiers in the timeline, and based on the comparison, at least a portion of the one or more interactive event identifiers assigned to the different sets of video fingerprints.

7. The method according to claim 6, comprising:
determining a version of the pre-recorded content; and
generating the timeline of the pre-recorded content based on one or more of the version of the pre-recoded content, a set of video fingerprints generated from a master of the pre-recorded content, and a timeline generated from the master of the prerecorded content.

8. The method according to claim 1, comprising:
receiving one or more inputs from a user or live trigger; and
generating based on the one or more inputs, a fingerprint-to-event association that comprises at least a portion of the one or more interactive event identifiers assigned to the different sets of video fingerprints.

9. The method according to claim 1, comprising:
receiving a network television schedule; and
generating based on the network television schedule, at least a portion of the one or more interactive event identifiers assigned to the different sets of video fingerprints.

10. The method according to claim 1, comprising communicating network time reference information to the plurality of fingerprint servers, each of the plurality of fingerprint servers being operable to communicate messages comprising the network time reference information to a corresponding fingerprint match system.

11. The method according to claim 1, comprising communicating to one or both of a television system and a web system the one or more interactive event identifiers, wherein:
the one or more interactive event identifiers are utilized by one or both of the television system and the web system to trigger interactive events; and
the communication is accomplished via one or more of an enhanced television binary interchange format (EBIF) triggering format for legacy cable systems, ID3 tags in web based devices supporting hypertext transfer protocol live streaming (HLS), and satellite network iTV protocols.

12. The method according to claim 1, wherein the assignment of the one or more interactive event identifiers to the different sets of video fingerprints is based on a media time corresponding to each identified interactive event.

13. The method according to claim 1, wherein each of the plurality of fingerprint servers is operable to communicate its corresponding set of video fingerprints and the assigned one or more interactive event identifiers to a corresponding fingerprint match system, the fingerprint match system being operable to communicate with a plurality of devices that utilize the same video fingerprint technology utilized by the fingerprint server that corresponds to that fingerprint match system.

14. A system, comprising:
a real-time event manager that is operable to:
receive one or more interactive event identifiers from one or more sources, wherein the one or more interactive event identifiers are utilized to trigger one or more interactive events; and
trigger timing of assignment of the one or more interactive event identifiers to different sets of video fingerprints; wherein:
a different set of video fingerprints is generated from same portions of a network television feed by a respective one of a plurality of fingerprint servers;
each of the plurality of fingerprint servers utilize a video fingerprint technology that is different from a video fingerprint technology utilized by any of the other fingerprint servers; and
identical interactive event identifiers are assigned to the different set of video fingerprints that are generated from the same portions of the network television feed by the different fingerprint technologies.

15. The system according to claim 14, wherein the real-time event manager is operable to assign to a set of audio fingerprints the one or more interactive event identifiers, the set of audio fingerprints being generated from the network television feed by an audio server utilizing an audio fingerprint technology.

16. The system according to claim 15, wherein the audio server is operable to communicate the audio fingerprints and the assigned one or more interactive event identifiers to a corresponding fingerprint match system, the fingerprint match system being operable to communicate with a plurality of devices that utilize the same audio fingerprint technology utilized by the audio server.

17. The system according to claim 14, wherein the real-time event manager is operable to be synchronized with the plurality of fingerprint servers using a network time protocol reference clock.

18. The system according to claim 14, comprising a monitor application module that is communicatively coupled to the real-time event manager, the monitor application module being operable to:
generate a set of video fingerprints in real time from the network television feed;

compare the generated set of video fingerprints to a set of video fingerprints generated from pre-recorded content; and determine at least a portion of the interactive event identifiers based on the comparison.

19. The system according to claim 18, wherein the monitor application module is operable to:

generate a timeline from the pre-recorded content, the timeline comprising a plurality of interactive event identifiers, each of which corresponds to a particular time in the timeline; and determine from the plurality of interactive event identifiers in the timeline, and based on the comparison, at least a portion of the one or more interactive event identifiers assigned to the different sets of video fingerprints.

20. The system according to claim 19, wherein the monitor application module is operable to:

determine a version of the pre-recorded content; and generate the timeline of the pre-recorded content based on one or more of the version of the pre-recoded content, a set of video fingerprints generated from a master of the pre-recorded content, and a timeline generated from the master of the prerecorded content.

21. The system according to claim 14, wherein the real-time event manager is operable to:

receive one or more inputs from a user or live trigger; and generate based on the one or more inputs, event triggers that comprises at least a portion of the one or more interactive event identifiers assigned to the different sets of video fingerprints via the corresponding RTFS's.

22. The system according to claim 14, wherein the real-time event manager is operable to:

receive a network television schedule; and generate based on the network television schedule, at least a portion of the one or more interactive event identifiers assigned to the different sets of video fingerprints.

23. The system according to claim 14, wherein the real-time event manager is operable to communicate network time reference information to the plurality of fingerprint servers, each of the plurality of fingerprint servers being operable to communicate messages comprising the network time reference information to a corresponding fingerprint match system.

24. The system according to claim 14, wherein the real-time event manager is operable to communicate to one or both of a television system and a web system the one or more interactive event identifiers, wherein:

the one or more interactive event identifiers are utilized by one or both of the television system and the web based system to trigger interactive events; communication is accomplished via one or more of an enhanced television binary interchange format (EBIF) triggering mechanism for legacy cable systems, ID3 tags in web based devices supporting hypertext transfer protocol live streaming (HLS), and satellite network iTV protocols.

25. The system according to claim 14, wherein the assignment of the one or more interactive event identifiers to the different sets of video fingerprints is based on a media time corresponding to each identified interactive event.

26. The system according to claim 14, wherein each of the plurality of fingerprint servers is operable to communicate its corresponding set of video fingerprints and the assigned one or more interactive event identifiers to a corresponding fingerprint match system, the fingerprint match system being operable to communicate with a plurality of devices that utilize the same video fingerprint technology utilized by the fingerprint server that corresponds to that fingerprint match system.

27. A non-transitory computer readable media having stored thereon a computer program having at least one code section for processing data, the at least one code section being executable by a computer to cause the computer to perform steps comprising:

in a real-time event manager:

receiving one or more interactive event identifiers from one or more sources, wherein the one or more interactive event identifiers are utilized to trigger one or more interactive events; and triggering timing of assignment of the one or more interactive event identifiers to different sets of video fingerprints, wherein:

a different sets of video fingerprints is generated from same portions of a network television feed by a respective one of a plurality of fingerprint servers;

each of the plurality of fingerprint servers being operable to utilize a video fingerprint technology that is different from a video fingerprint technology utilized by any of the other fingerprint servers; and identical interactive event identifiers are assigned to the different set of video fingerprints that are generated from the same portions of the network television feed by the different fingerprint technologies.

28. The non-transitory computer readable media according to claim 27, wherein the at least one code section comprises code for assigning to a set of audio fingerprints the one or more interactive event identifiers, the set of audio fingerprints being generated from the network television feed by an audio server utilizing an audio fingerprint technology.

29. The non-transitory computer readable media according to claim 28, wherein the audio server is operable to communicate the audio fingerprints and the assigned one or more interactive event identifiers to a corresponding fingerprint match system, the fingerprint match system being operable to communicate with a plurality of devices that utilize the same audio fingerprint technology utilized by the audio server.

30. The non-transitory computer readable media according to claim 27, wherein the at least one code comprises code for synchronizing the real-time event manager to the plurality of servers using a network time protocol reference clock.

31. The non-transitory computer readable media according to claim 27, wherein the at least one code section comprises code for:

generating in a monitor application module communicatively coupled to the real-time event manager, a set of video fingerprints in real time from the network television feed;

comparing the generated set of video fingerprints to a set of video fingerprints generated from pre-recorded content; and determining at least a portion of the interactive event identifiers based on the comparison.

32. The non-transitory computer readable media according to claim 31, wherein the at least one code section comprises code for:

generating a timeline from the pre-recorded content, the timeline comprising a plurality of interactive event identifiers, each of which corresponds to a particular time in the timeline; and determining from the plurality of interactive event identifiers in the timeline, and based on the comparison, at least a portion of the one or more interactive event identifiers assigned to the different sets of video fingerprints.

33. The non-transitory computer readable media according to claim 32, wherein the at least one code section comprises code for:
  determining a version of the pre-recorded content; and
  generating the timeline of the pre-recorded content based on one or more of the version of the pre-recoded content, a set of video fingerprints generated from a master of the pre-recorded content, and a timeline generated from the master of the prerecorded content.

34. The non-transitory computer readable media according to claim 27, wherein the at least one code section comprises code for:
  receiving one or more inputs from a user or live trigger; and
  generating based on the one or more inputs, a fingerprint-to-event association that comprises at least a portion of the one or more interactive event identifiers assigned to the different sets of video fingerprints.

35. The non-transitory computer readable media according to claim 27, wherein the at least one code section comprises code for:
  receiving a network television schedule; and
  generating based on the network television schedule, at least a portion of the one or more interactive event identifiers assigned to the different sets of video fingerprints.

36. The non-transitory computer readable media according to claim 27, wherein the at least one code section comprises code for communicating network time reference information to the plurality of fingerprint servers, each of the plurality of fingerprint servers being operable to communicate messages comprising the network time reference information to a corresponding fingerprint match system.

37. The non-transitory computer readable media according to claim 27, wherein the at least one code section comprises code for communicating to one or both of a television system and a web system the one or more interactive event identifiers, wherein:
  the one or more interactive event identifiers are utilized by one or both of the television system and the web system to trigger interactive events; and
  the communication is accomplished via one or more of an enhanced television binary interchange format (EBIF) triggering mechanism for legacy cable systems, ID3 tags in web based devices supporting hypertext transfer protocol live streaming (HLS), and satellite network iTV protocols.

38. The non-transitory computer readable media according to claim 27, wherein the assignment of the one or more interactive event identifiers to the different sets of video fingerprints is based on a time corresponding to each identified interactive event.

39. The non-transitory computer readable media according to claim 27, wherein each of the plurality of fingerprint servers is operable to communicate its corresponding set of video fingerprints and the assigned one or more interactive event identifiers to a corresponding fingerprint match system, the fingerprint match system being operable to communicate with a plurality of devices that utilize the same video fingerprint technology utilized by the fingerprint server that corresponds to that fingerprint match system.

40. A method, comprising:
  in a real-time event manager:
    receiving one or more interactive event identifiers from one or more sources;
    triggering the assignment to different sets of video fingerprints the one or more interactive event identifiers, wherein:
      a different set of video fingerprints is generated from a network television feed by a respective one of a plurality of fingerprint servers; and
      each of the plurality of fingerprint servers utilize a video fingerprint technology that is different from a video fingerprint technology utilized by any of the other fingerprint servers;
    generating in a monitor application module communicatively coupled to the real-time event manager, a set of video fingerprints in real time from the network television feed;
    comparing the generated set of video fingerprints to a set of video fingerprints generated from pre-recorded content;
    determining at least a portion of the interactive event identifiers based on the comparison;
    generating a timeline from the pre-recorded content, the timeline comprising a plurality of interactive event identifiers, each of which corresponds to a particular time in the timeline; and
    determining from the plurality of interactive event identifiers in the timeline, and based on the comparison, at least a portion of the one or more interactive event identifiers assigned to the different sets of video fingerprints.

41. The method according to claim 40, comprising:
determining a version of the pre-recorded content; and
generating the timeline of the pre-recorded content based on one or more of the version of the pre-recoded content, a set of video fingerprints generated from a master of the pre-recorded content, and a timeline generated from the master of the pre-recorded content.

42. A method, comprising:
in a real-time event manager:
  receiving one or more interactive event identifiers from one or more sources;
  triggering the assignment to different sets of video fingerprints the one or more interactive event identifiers, wherein:
    a different set of video fingerprints is generated from a network television feed by a respective one of a plurality of fingerprint servers; and
    each of the plurality of fingerprint servers utilize a video fingerprint technology that is different from a video fingerprint technology utilized by any of the other fingerprint servers; and
  communicating to one or both of a television system and a web system the one or more interactive event identifiers, wherein:
    the one or more interactive event identifiers are utilized by one or both of the television system and the web system to trigger interactive events; and
    the communication is accomplished via one or more of an enhanced television binary interchange format (EBIF) triggering format for legacy cable systems, ID3 tags in web based devices supporting hypertext transfer protocol live streaming (HLS), and satellite network iTV protocols.

43. A system, comprising:
a real-time event manager that is operable to:
  receive one or more interactive event identifiers from one or more sources;
  trigger the assignment to different sets of video fingerprints the one or more interactive event identifiers, wherein:

a different set of video fingerprints is generated from a network television feed by a respective one of a plurality of fingerprint servers; and each of the plurality of fingerprint servers utilize a video fingerprint technology that is different from a video fingerprint technology utilized by any of the other fingerprint servers;

a monitor application module that is communicatively coupled to the real-time event manager, the monitor application module being operable to:

generate in a monitor application module communicatively coupled to the real-time event manager, a set of video fingerprints in real time from the network television feed;

compare the generated set of video fingerprints to a set of video fingerprints generated from pre-recorded content;

determine at least a portion of the interactive event identifiers based on the comparison;

generate a timeline from the pre-recorded content, the timeline comprising a plurality of interactive event identifiers, each of which corresponds to a particular time in the timeline; and determine from the plurality of interactive event identifiers in the timeline, and based on the comparison, at least a portion of the one or more interactive event identifiers assigned to the different sets of video fingerprints.

44. The system according to claim 43, wherein the monitor application is operable to:

determine a version of the pre-recorded content; and generate the timeline of the pre-recorded content based on one or more of the version of the pre-recoded content, a set of video fingerprints generated from a master of the pre-recorded content, and a timeline generated from the master of the pre-recorded content.

45. A system, comprising:

a real-time event manager that is operable to:

receive one or more interactive event identifiers from one or more sources;

trigger the assignment to different sets of video fingerprints the one or more interactive event identifiers, wherein:

a different set of video fingerprints is generated from a network television feed by a respective one of a plurality of fingerprint servers; and each of the plurality of fingerprint servers utilize a video fingerprint technology that is different from a video fingerprint technology utilized by any of the other fingerprint servers; and communicate to one or both of a television system and a web system the one or more interactive event identifiers, wherein:

the one or more interactive event identifiers are utilized by one or both of the television system and the web system to trigger interactive events; and the communication is accomplished via one or more of an enhanced television binary interchange format (EBIF) triggering format for legacy cable systems, ID3 tags in web based devices supporting hypertext transfer protocol live streaming (HLS), and satellite network iTV protocols.

46. A non-transitory computer readable media having stored thereon a computer program having at least one code section for processing data, the at least one code section being executable by a computer to cause the computer to perform steps comprising:

in a real-time event manager:

receiving one or more interactive event identifiers from one or more sources; and triggering the assignment to different sets of video fingerprints the one or more interactive event identifiers, wherein:

a different sets of video fingerprints is generated from a network television feed by a respective one of a plurality of fingerprint servers; and each of the plurality of fingerprint servers being operable to utilize a video fingerprint technology that is different from a video fingerprint technology utilized by any of the other fingerprint servers;

generating in a monitor application module communicatively coupled to the real-time event manager, a set of video fingerprints in real time from the network television feed;

comparing the generated set of video fingerprints to a set of video fingerprints generated from pre-recorded content;

determining at least a portion of the interactive event identifiers based on the comparison;

generating a timeline from the pre-recorded content, the timeline comprising a plurality of interactive event identifiers, each of which corresponds to a particular time in the timeline; and determining from the plurality of interactive event identifiers in the timeline, and based on the comparison, at least a portion of the one or more interactive event identifiers assigned to the different sets of video fingerprints.

47. The non-transitory computer readable media according to claim 46, wherein the at least one code section comprises code for:

determining a version of the pre-recorded content; and generating the timeline of the pre-recorded content based on one or more of the version of the pre-recoded content, a set of video fingerprints generated from a master of the pre-recorded content, and a timeline generated from the master of the pre-recorded content.

48. A non-transitory computer readable media having stored thereon a computer program having at least one code section for processing data, the at least one code section being executable by a computer to cause the computer to perform steps comprising:

in a real-time event manager:

receiving one or more interactive event identifiers from one or more sources; and triggering the assignment to different sets of video fingerprints the one or more interactive event identifiers, wherein:

a different sets of video fingerprints is generated from a network television feed by a respective one of a plurality of fingerprint servers; and each of the plurality of fingerprint servers being operable to utilize a video fingerprint technology that is different from a video fingerprint technology utilized by any of the other fingerprint servers; and communicating to one or both of a television system and a web system the one or more interactive event identifiers, wherein:

the one or more interactive event identifiers are utilized by one or both of the television system and the web system to trigger interactive events; and the communication is accomplished via one or more of an enhanced television binary interchange format (EBIF) triggering mechanism for legacy cable systems, ID3 tags in web based devices supporting hypertext transfer protocol live streaming (HLS), and satellite network iTV protocols.

\* \* \* \* \*